US010880914B2

(12) United States Patent
Sundararajan et al.

(10) Patent No.: US 10,880,914 B2
(45) Date of Patent: Dec. 29, 2020

(54) GRANT FREE UPLINK TRANSMISSION TECHNIQUES

(71) Applicant: QUALCOMM Incorporated, San Diego, CA (US)

(72) Inventors: Jay Kumar Sundararajan, San Diego, CA (US); Chih-Ping Li, San Diego, CA (US); Jing Jiang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/284,341

(22) Filed: Feb. 25, 2019

(65) Prior Publication Data
US 2019/0268923 A1 Aug. 29, 2019

Related U.S. Application Data

(60) Provisional application No. 62/635,516, filed on Feb. 26, 2018.

(51) Int. Cl.
*H04W 72/12* (2009.01)
*H04W 92/10* (2009.01)
*H04W 74/04* (2009.01)

(52) U.S. Cl.
CPC ... *H04W 72/1268* (2013.01); *H04W 72/1289* (2013.01); *H04W 74/04* (2013.01); *H04W 92/10* (2013.01)

(58) Field of Classification Search
CPC .............. H04W 72/04; H04W 72/042; H04W 72/0446; H04W 72/12; H04W 72/1268;
(Continued)

(56) References Cited

U.S. PATENT DOCUMENTS 10,205,581 B2 * 2/2019 Islam ................... H04L 27/2602
2009/0141680 A1 * 6/2009 Becker .............. H04W 74/0866
370/329
(Continued)

FOREIGN PATENT DOCUMENTS

WO WO-2018145019 A1 * 8/2018 .......... H04W 72/042
WO WO-2019140060 A1 * 7/2019 ........... H04L 5/0053
(Continued)

OTHER PUBLICATIONS

Qualcomm Incorporated, Control channel for slot format indicator, Nov. 18, 2016, 3GPP, 3GPP TSG-RAN WG1 #87, Tdoc: R1-1612062 (Year: 2016).*
(Continued)

*Primary Examiner* — Eric Nowlin
(74) *Attorney, Agent, or Firm* — Steven A. Raney

(57) ABSTRACT

The described techniques relate to techniques for determining transmission opportunities and utilization of uplink resources by a user equipment (UE) in communication with a base station. In some examples, a base station may transmit a slot configuration to a UE. The slot configuration may indicate the communication link direction (uplink, downlink, or flexible) associated with each symbol in a given slot. A dynamic slot configuration may indicate which of the flexible symbols are uplink symbols and which are downlink symbols and the UE may determine uplink transmission opportunities based on the slot configuration, the dynamic slot configuration, and a grant free uplink type associated with the UE. The UE may transmit an uplink data message to the base station using the determined set of uplink transmission resources.

30 Claims, 14 Drawing Sheets

(58) Field of Classification Search
CPC .. H04W 72/1289; H04W 74/04; H04W 92/10
See application file for complete search history.

(56) References Cited

U.S. PATENT DOCUMENTS

| | | | | |
|---|---|---|---|---|
| 2016/0353436 | A1* | 12/2016 | Au | H04L 5/1469 |
| 2018/0035459 | A1* | 2/2018 | Islam | H04L 5/0096 |
| 2018/0083758 | A1* | 3/2018 | Islam | H04W 72/044 |
| 2018/0199359 | A1* | 7/2018 | Cao | H04W 72/1268 |
| 2018/0278380 | A1* | 9/2018 | Kim | H04L 1/1861 |
| 2018/0279274 | A1* | 9/2018 | Sun | H04W 72/042 |
| 2018/0279304 | A1* | 9/2018 | Lee | H04L 5/0094 |
| 2018/0309513 | A1 | 10/2018 | Kim et al. | |
| 2018/0324689 | A1* | 11/2018 | Li | H04W 72/042 |
| 2018/0367289 | A1* | 12/2018 | Kim | H04L 5/1469 |
| 2018/0376476 | A1* | 12/2018 | Lee | H04W 72/042 |
| 2019/0045529 | A1* | 2/2019 | Xiong | H04W 72/1284 |
| 2019/0053227 | A1* | 2/2019 | Huang | H04L 5/0094 |
| 2019/0123883 | A1* | 4/2019 | Islam | H04L 5/0083 |
| 2019/0149269 | A1* | 5/2019 | Chatterjee | H04W 74/0858 370/329 |
| 2019/0230689 | A1* | 7/2019 | Cao | H04L 1/1819 |
| 2019/0253232 | A1* | 8/2019 | Park | H04L 5/1407 |
| 2019/0254024 | A1* | 8/2019 | Nam | H04W 72/0446 |
| 2019/0261454 | A1* | 8/2019 | Xiong | H04L 25/0226 |
| 2019/0268923 | A1* | 8/2019 | Sundararajan | H04W 72/1289 |
| 2019/0297629 | A1* | 9/2019 | Lin | H04L 5/0053 |
| 2019/0306848 | A1* | 10/2019 | Zhou | H04W 72/0406 |
| 2019/0306857 | A1* | 10/2019 | Lin | H04W 24/08 |
| 2019/0312665 | A1* | 10/2019 | Jo | H04W 88/023 |
| 2019/0320448 | A1* | 10/2019 | Fakoorian | H04W 72/0446 |
| 2019/0349904 | A1* | 11/2019 | Kwak | H04L 25/0238 |
| 2019/0380143 | A1* | 12/2019 | Zhang | H04W 72/14 |
| 2020/0008204 | A1* | 1/2020 | Matsumura | H04L 5/0051 |
| 2020/0008222 | A1* | 1/2020 | Cao | H04L 5/0053 |
| 2020/0037346 | A1* | 1/2020 | Takeda | H04L 5/0051 |
| 2020/0045722 | A1* | 2/2020 | Bae | H04W 72/04 |
| 2020/0045738 | A1* | 2/2020 | Oh | H04W 74/0808 |

FOREIGN PATENT DOCUMENTS

| | | | | |
|---|---|---|---|---|
| WO | WO-2019157954 | A1 * | 8/2019 | H04W 72/04 |
| WO | WO-2019192531 | A1 * | 10/2019 | H04L 5/00 |

OTHER PUBLICATIONS

Qualcomm Incorporated, Simultaneous scheduling request and data transmission for uplink URLLC, Apr. 7, 2017, 3GPP, 3GPP TSG-RAN WG1 NR #88-bis, Tdoc: R1- 1705616 (Year: 2017).*

Huawei et al., UL data transmission procedure without UL grant, Dec. 1, 2017, 3GPP, 3GPP TSG RAN WG1 Meeting #91, Tdoc: R1-1719411 (Year: 2017).*

Zte et al., Remaining details of UL transmission without grant, Dec. 1, 2017, 3GPP, 3GPP TSG RAN WG1 Meeting 91, Tdoc: R1-1719516 (Year: 2017).*

Intel Corporation, Remaining aspects of Group common PDCCH and SFI, Dec. 1, 2017, 3GPP, 3GPP TSG RAN WG1 Meeting #91, Tdoc: R1-1720083 (Year: 2017).*

CATT, On semi-static and dynamic signaling of SFI, Dec. 1, 2017, 3GPP, 3GPP TSG RAN WG1 Meeting #91, Tdoc: R1-1720192 (Year: 2017).*

Samsung, Procedures for UL Transmissions, Dec. 1, 2017, 3GPP, 3GPP TSG RAN WG1 Meeting 91, Tdoc: R1-1720342 (Year: 2017).*

NEC, Remaining issues on UL transmission without grant, Dec. 1, 2017, 3GPP, 3GPP TSG RAN WG1 Meeting #91, Tdoc: R1-1720382 (Year: 2017).*

Nokia et al., On remaining issues for UL transmission without grant, Dec. 1, 2017, 3GPP, 3GPP TSG-RAN WG1 Meeting 91, Tdoc: R1-1720481 (Year: 2017).*

Institute for Information Industry (III), Procedure for Reliable UL Transmission in URLLC, Dec. 1, 2017, 3GPP, 3GPP TSG-RAN WG1 Meeting 91, Tdoc: R1-1720566 (Year: 2017).*

China Telecom, Remaining issues on UL transmission without grant, Dec. 1, 2017, 3GPP, 3GPP TSG RAN WG1 Meeting #91, Tdoc: R1-1720580 (Year: 2017).*

InterDigital Inc., Remaining Details of UL Transmission without Grant, Dec. 1, 2017, 3GPP, 3GPP TSG RAN WG1 Meeting 91, Tdoc: R1-1720640 (Year: 2017).*

Sequans, Remaining details of the UL transmission without grant, Dec. 1, 2017, 3GPP, 3GPP TSG RAN WG1 Meeting 91, Tdoc: R1-1720906 (Year: 2017).*

Qualcomm Incorporated, Offline discussion on GC-PDCCH carrying SFI, Dec. 1, 2017, 3GPP, 3GPP TSG RAN WG1 #91, Tdoc: R1-1721702 (Year: 2017).*

Huawei et al., Remaining issues on SFI with TP, Jan. 26, 2018, 3GPP, 3GPP TSG RAN WG1 Ad Hoc Meeting, Tdoc: R1-1800838 (Year: 2018).*

Qualcomm Incorporated, Offline discussions on GC-PDCCH carrying SFI, Jan. 26, 2018, 3GPP, 3GPP TSG RAN WG1 NR AH 1801, Tdoc: R1-1801254 (Year: 2018).*

Huawei et al., "Remaining Details on Group-Common PDCCH", 3GPP Draft; R1-1715396, 3rd Generation Partnership Project (3GPP), Mobile Competence Centre; 650, Route Des Lucioles ; F-06921 Sophia-Antipolis Cedex ; France, vol. RAN WG1, No. Nagoya, Japan; Sep. 18, 2017-Sep. 21, 2017, Sep. 9, 2017 (Sep. 9, 2017), XP051328960, 6 Pages, Retrieved from the Internet: URL:http://www.3gpp.org/ftp/tsg_ran/WG1_RL1/TSGR1_AH/NR_AH_1709/Docs/ [retrieved on Sep. 9, 2017], Method of Dynamic Slot Configuration for URLLC Using Slot Format Determination/SFI; Definition of Flexible Symbols and Transmission Direction;Paragraph [0001]-Paragraph [0002].

International Search Report and Written Opinion—PCT/US2019/019629—ISA/EPO—dated May 6, 2019.

NTT DOCOMO et al., "Offline Summary for AI 7.3.3.4 UL Data Transmission Procedure", 3GPP Draft; R1-1721415, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 27, 2017-Dec. 1, 2017, Nov. 28, 2017 (Nov. 28, 2017), XP051363872, 25 Pages, Retrieved from the Internet: URL:http://www.3gpp.org/ftp/Meetings%5F3GPP%5FSYNC/RAN1/Docs/ [retrieved on Nov. 28, 2017], Grant-free Type 2 Resource Configuration With Flexible Symbols; Define Resources Using Periodicity; Offset and Transmission Pattern; Paragraph [0007].

Samsung: "Corrections on UE-Group Common PDCCH", 3GPP Draft; R1-1801975 GC-PDCCH, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 2, 2018, Feb. 17, 2018 (Feb. 17, 2018), XP051397779, 3 Pages, Retrieved from the Internet: URL: http://www.3gpp.org/ftp/tsg%5Fran/WG1%5FRL1/TSGR1%5F92/Docs/ [retrieved on Feb. 17, 2018], Slot Configuration; DCI Format 2 0 Used for Semi-Static Configuration; Take Into Consideration SFI and DCI for UL Transmissions; Paragraph [0002].

Samsung: "Slot Reconfiguration for Low Latency in TDD", 3GPP Draft; R1-1715987, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), pp. 1-6, XP051339446, Retrieved from the Internet: URL: http://www.3gpp.org/ftp/Meetings_3GPP_SYNC/RAN1/Docs/ and http://www.3gpp.org/ftp/Meetings_3GPP_SYNC/RAN1/Docs/ [retrieved on Sep. 17, 2017], Sections 1-2.Dynamic Slot Reconfiguration for Low Latyncy URLLC in TDD; Define Semi-Static Resources with Periodicity and SFI for Flexible Resources; Paragraph [0001]-Paragraph [0002].

Sharp: "Slot Format Determination in NR", 3GPP Draft; R1-1800612, 3rd Generation Partnership Project (3GPP), Mobile CompetenceCentre ; 650, Route Des Lucioles ; F-06921 Sophia-Antipolis Cedex ; France, vol. RAN WG1, No. Vancouver, Canada; Jan. 22, 2018-Jan. 26, 2018, Jan. 12, 2018 (Jan. 12, 2018), XP051384394, 5 Pages, Retrieved from the Internet:URL:http://www.3gpp.org/ftp/tsg%

(56) References Cited

OTHER PUBLICATIONS

5Fran/WG1%5FRL1/TSGR1%5FAH/NR%5FAH%5F1801/Docs/ [retrieved on Jan. 12, 2018], Slot Format Determination in NR;Paragraph [0002].

* cited by examiner

| | |
|---|---|
|  | Dynamic Slot Configuration 225 |
|  | Slot Configuration 220 |
|  | Grant Free Indication 215 |
|  | Grant Free Uplink Data 230 |

GRANT FREE UPLINK TRANSMISSION TECHNIQUES

CROSS REFERENCES

The present Application for Patent claims the benefit of U.S. Provisional Patent Application No. 62/635,516 by Sundararajan et al., entitled "GRANT FREE UPLINK TRANSMISSION TECHNIQUES," filed Feb. 26, 2018, assigned to the assignee hereof, and expressly incorporated by reference in its entirety herein.

BACKGROUND

The following relates generally to wireless communications, and more specifically to grant free uplink transmission techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE in a wireless communications system may be configured with a set of resources to perform uplink transmissions. In some cases, the resources may be configured in a semi-static or semi-persistent manner, which may result in resources being configured for uplink transmissions, downlink transmissions, and flexible transmissions that may later be designated for uplink or downlink transmissions. The variability of some resources may cause inconsistent selection and utilization of resources for transmission by a UE, which may complicate detection of such transmissions at a base station in communication with the UE.

SUMMARY

The described techniques relate to improved methods, systems, devices, or apparatuses that support grant free uplink transmission techniques. Generally, the described techniques provide for determination of transmission opportunities and utilization of uplink resources by a user equipment (UE) in communication with a base station. In some examples, a base station may transmit a slot configuration to a UE. The slot configuration may indicate the communication link direction (uplink, downlink, or flexible) associated with each symbol in a given slot. The flexible symbols may be later used for uplink or downlink transmissions, which may further be specified by a dynamic configuration indication (e.g., a slot format indicator (SFI)). The dynamic configuration may indicate which of the flexible symbols are uplink symbols and which are downlink symbols. The dynamic configuration may be provided to a UE via downlink control information (DCI) (e.g., transmitted by a base station to a UE via a physical downlink control channel (PDCCH)).

In some cases, a base station may provide an indication of a grant free uplink type to a UE. The grant free uplink type may indicate to the UE whether to consider flexible symbols (as indicated by the slot configuration) when determining the transmission opportunities for a grant free uplink transmission. The base station may also convey a transmission pattern for uplink data transmission opportunities. The transmission pattern may include a resource offset and a periodicity for the UE, which may additionally be used by the UE in determining the transmission opportunities for a grant free uplink transmission.

A method of wireless communications is described. The method may include receiving, from a base station, a slot configuration that indicates a link direction pattern for symbols of a first slot, where the link direction pattern specifies each symbol as a downlink symbol, an uplink symbol, or a flexible symbol, identifying a transmission pattern of uplink data transmission opportunities and a grant free uplink type for a UE, where the grant free uplink type indicates whether to consider flexible symbols as uplink transmission opportunities, determining a set of uplink resources of the first slot for transmission of uplink data based on the slot configuration, the transmission pattern, and the grant free uplink type, and transmitting an uplink data message to the base station using the determined set of the uplink resources.

An apparatus for wireless communications is described. The apparatus may include means for receiving, from a base station, a slot configuration that indicates a link direction pattern for symbols of a first slot, where the link direction pattern specifies each symbol as a downlink symbol, an uplink symbol, or a flexible symbol, means for identifying a transmission pattern of uplink data transmission opportunities and a grant free uplink type for a UE, where the grant free uplink type indicates whether to consider flexible symbols as uplink transmission opportunities, means for determining a set of uplink resources of the first slot for transmission of uplink data based on the slot configuration, the transmission pattern, and the grant free uplink type, and means for transmitting an uplink data message to the base station using the determined set of the uplink resources.

Another apparatus for wireless communications is described. The apparatus may include a processor, memory in electronic communication with the processor, and instructions stored in the memory. The instructions may be operable to cause the processor to receive, from a base station, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for a UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and transmit an uplink data message to the base station using the determined set of the uplink resources.

A non-transitory computer-readable medium for wireless communications is described. The non-transitory computer-readable medium may include instructions operable to cause a processor to receive, from a base station, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for a UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and transmit an uplink data message to the base station using the determined set of the uplink resources.

Some examples of the method, apparatus, and non-transitory computer-readable medium described herein may further include processes, features, means, or instructions for receiving, from the base station, an indication of the grant free uplink type associated with the UE.

In some examples of the method, apparatus, and non-transitory computer-readable medium described herein, the indication includes the transmission pattern for the UE, the transmission pattern including a resource offset and a periodicity of uplink data transmission opportunities for the UE. In some examples of the method, apparatus, and non-transitory computer-readable medium described herein, the set of uplink resources may be determined based on the resource offset and the periodicity of uplink data transmission opportunities for the UE.

Some examples of the method, apparatus, and non-transitory computer-readable medium described herein may further include processes, features, means, or instructions for receiving a dynamic slot configuration that specifies each flexible symbol specified by the link direction pattern as an uplink symbol or a downlink symbol, where the set of uplink resources may be determined based on the dynamic slot configuration.

In some examples of the method, apparatus, and non-transitory computer-readable medium described herein, the set of uplink resources includes at least one symbol specified by the link direction pattern as flexible based on the dynamic slot configuration.

In some examples of the method, apparatus, and non-transitory computer-readable medium described herein, the set of uplink resources excludes flexible symbols as specified by the link direction pattern based on the grant free uplink type.

Some examples of the method, apparatus, and non-transitory computer-readable medium described herein may further include processes, features, means, or instructions for receiving the slot configuration in a slot preceding the first slot.

A method of wireless communications is described. The method may include transmitting, to a UE, a slot configuration that indicates a link direction pattern for symbols of a first slot, where the link direction pattern specifies each symbol as a downlink symbol, an uplink symbol, or a flexible symbol, identifying a transmission pattern of uplink data transmission opportunities and a grant free uplink type for the UE, where the grant free uplink type indicates whether to consider flexible symbols as uplink transmission opportunities, determining a set of uplink resources of the first slot for transmission of uplink data based on the slot configuration, the transmission pattern, and the grant free uplink type, and monitoring the determined set of uplink resources for uplink data from the UE.

An apparatus for wireless communications is described. The apparatus may include means for transmitting, to a UE, a slot configuration that indicates a link direction pattern for symbols of a first slot, where the link direction pattern specifies each symbol as a downlink symbol, an uplink symbol, or a flexible symbol, means for identifying a transmission pattern of uplink data transmission opportunities and a grant free uplink type for the UE, where the grant free uplink type indicates whether to consider flexible symbols as uplink transmission opportunities, means for determining a set of uplink resources of the first slot for transmission of uplink data based on the slot configuration, the transmission pattern, and the grant free uplink type, and means for monitoring the determined set of uplink resources for uplink data from the UE.

Another apparatus for wireless communications is described. The apparatus may include a processor, memory in electronic communication with the processor, and instructions stored in the memory. The instructions may be operable to cause the processor to transmit, to a UE, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for the UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and monitor the determined set of uplink resources for uplink data from the UE.

A non-transitory computer-readable medium for wireless communications is described. The non-transitory computer-readable medium may include instructions operable to cause a processor to transmit, to a UE, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for the UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and monitor the determined set of uplink resources for uplink data from the UE.

Some examples of the method, apparatus, and non-transitory computer-readable medium described herein may further include processes, features, means, or instructions for transmitting, to the UE, an indication of the grant free uplink type for the UE.

In some examples of the method, apparatus, and non-transitory computer-readable medium described herein, the indication includes the transmission pattern for the UE, the transmission pattern including a resource offset and a periodicity of uplink data transmission opportunities for the UE. In some examples of the method, apparatus, and non-transitory computer-readable medium described herein, the set of uplink resources may be monitored based on the resource offset and the periodicity of uplink data transmission opportunities for the UE.

Some examples of the method, apparatus, and non-transitory computer-readable medium described herein may further include processes, features, means, or instructions for transmitting a dynamic slot configuration that specifies each flexible symbol specified by the pattern as an uplink symbol or a downlink symbol, where the set of uplink resources may be determined based on the dynamic slot configuration.

In some examples of the method, apparatus, and non-transitory computer-readable medium described herein, the dynamic slot configuration may be transmitted to the UE or a different UE.

In some examples of the method, apparatus, and non-transitory computer-readable medium described herein, the set of uplink resources includes at least one symbol specified by the link direction pattern as flexible based on the dynamic slot configuration.

In some examples of the method, apparatus, and non-transitory computer-readable medium described herein, monitoring the determined set of uplink resources includes receiving, from the UE, an uplink data message via the determined set of uplink resources.

In some examples of the method, apparatus, and non-transitory computer-readable medium described herein, the set of uplink resources excludes flexible symbols as specified by the link direction pattern based on the grant free uplink type.

Some examples of the method, apparatus, and non-transitory computer-readable medium described herein may further include processes, features, means, or instructions for transmitting the slot configuration in a slot preceding the first slot.

DETAILED DESCRIPTION

Figure 1:
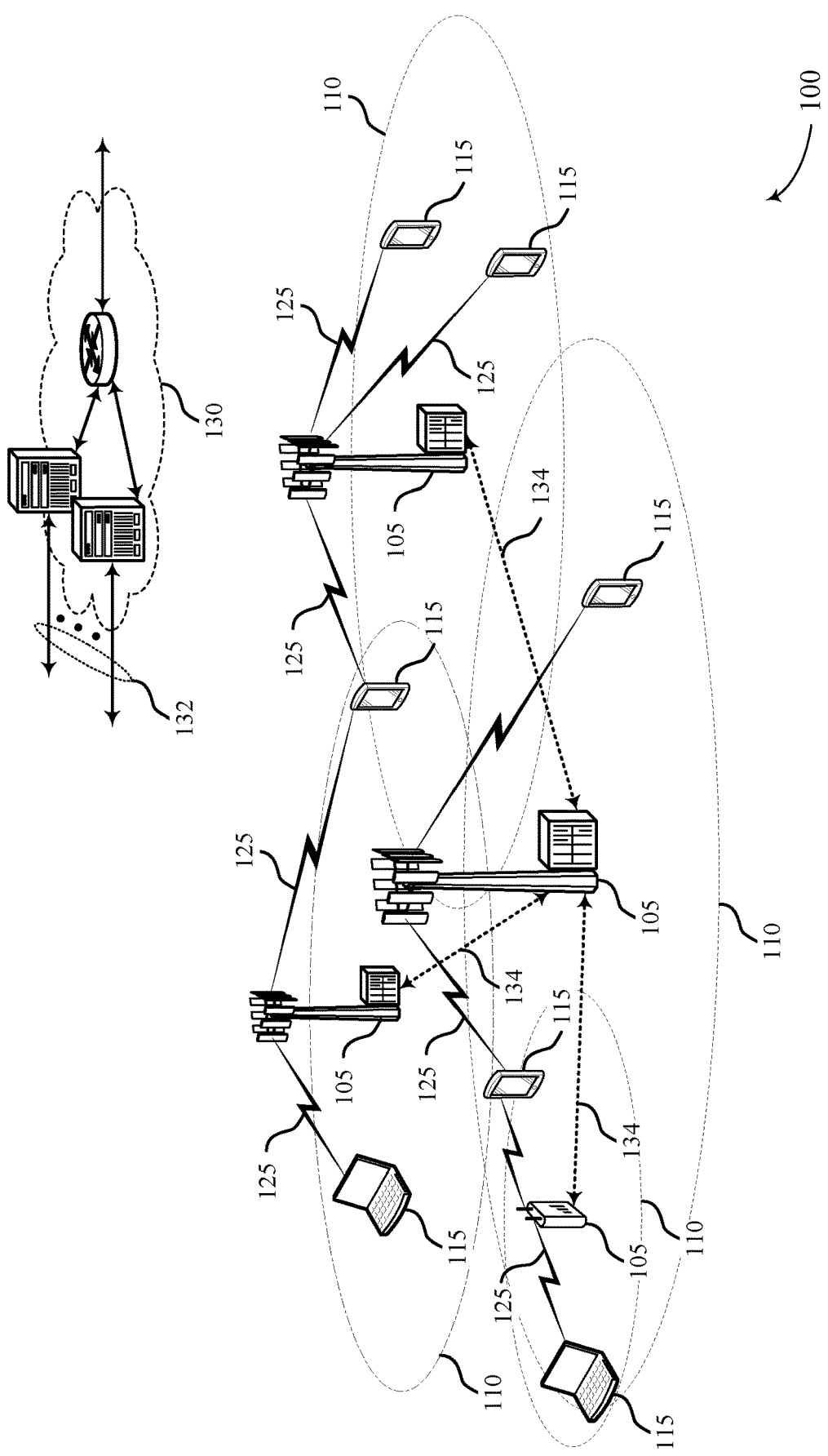
FIG. 1 illustrates an example of a wireless communications system that supports grant free uplink transmission techniques in accordance with aspects of the present disclosure.

Various described techniques provide for determining uplink data transmission opportunities by a user equipment (UE) and monitoring for these opportunities by a base station in a wireless communications system. The uplink data transmission opportunities may be for grant free transmissions. Grant free transmission may refer to transmissions by a device (e.g., a UE) that are not explicitly associated with a grant or that are otherwise not explicitly scheduled by a network entity (e.g., a base station). For instance, grant free transmissions may be supported through a semi-static resource allocation, resources configured for unscheduled transmissions, or resources specified as grant free resources.

In some cases, a base station may identify (e.g., determine or receive information from a network node) an uplink grant free type associated with the UE and a transmission pattern (e.g., a resource offset and a periodicity) for the UE. The base station may indicate this information to the UE (e.g., via radio resource control (RRC) signaling). The base station may also indicate a slot configuration to the UE, which may specify a communication direction associated with each symbol in a given slot. For instance, the slot configuration may indicate that of the 14 symbols in a given slot, 7 are allocated for uplink transmission, 5 are allocated for downlink transmission, and 2 are allocated as flexible symbols. The slot configuration may include a specific pattern of the uplink, downlink, and/or flexible symbols that corresponds to the given slot.

Using the slot configuration and the transmission pattern, the UE may determine the symbols available for uplink data transmission opportunities. For example, if the UE is operating according to a first uplink grant free type (Type-1), the UE may determine the uplink data transmission opportunities based on the number of uplink symbols indicated by the slot configuration. Although the slot configuration may include one or more flexible symbols, these flexible symbols may not be considered by the UE operating according to Type-1. Further, if the flexible symbols are later indicated as uplink symbols (e.g., via a dynamic slot configuration indicated through downlink control information (DCI) or an SFI), a UE operating according to Type-1 may still only consider the uplink symbols specified by the slot configuration in determining transmission opportunities for grant free uplink data transmissions.

A UE operating according to a second uplink grant free type (Type-2) may determine uplink data transmission opportunities based on the dynamic slot configuration. For instance, the UE may identify uplink symbols based on the received slot configuration and also may identify flexible symbols designated for uplink as specified by the dynamic slot configuration, and may consider all of these symbols when determining transmission opportunities for uplink data.

In this way, since the UE and base station will be aligned with respect to how the uplink data transmission opportunities are to be determined, a UE and base station may operate according to a grant free transmission scheme with reduced instances of errors and increased efficiency. For example, a base station may be able to correctly identify the resources that a UE will choose to use for grant free uplink transmissions, thereby reducing the monitoring time and resources by the base station, which may increase reliability associated with such grant free transmission schemes.

Aspects of the disclosure are initially described in the context of a wireless communications system. Aspects are then described with respect to slot configurations and a process flow. Aspects of the disclosure are further illustrated by and described with reference to apparatus diagrams, system diagrams, and flowcharts that relate to grant free uplink transmission techniques.

FIG. 1 illustrates an example of a wireless communications system 100 that supports grant free uplink transmission techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiple access (OFDM) or discrete Fourier transform-spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA configuration or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 may operate according to uplink grant free Type-1 or Type-2, which may be indicated (e.g., in a control message via RRC signaling) by a base station 105. The base station may also indicate a slot configuration that includes a link direction pattern for symbols of a slot, some of which may be specified as flexible symbols. The flexible symbol may be dynamically indicated as uplink or downlink symbol (e.g., via a dynamic slot configuration). Depending on the uplink grant free type, a UE 115 may choose to consider or not to consider the flexible symbols when determining uplink data transmission opportunities. Additionally, the base station 105 may convey a transmission pattern to a UE 115, which may indicate a resource offset and a periodicity for the UE to use when determining uplink transmission opportunities. Based on the transmission pattern, slot configuration(s), and grant free type, the UE 115 may determine uplink data transmission opportunities and a base station 105 may monitor these opportunities for uplink data transmissions from the UE 115.

Figure 2:
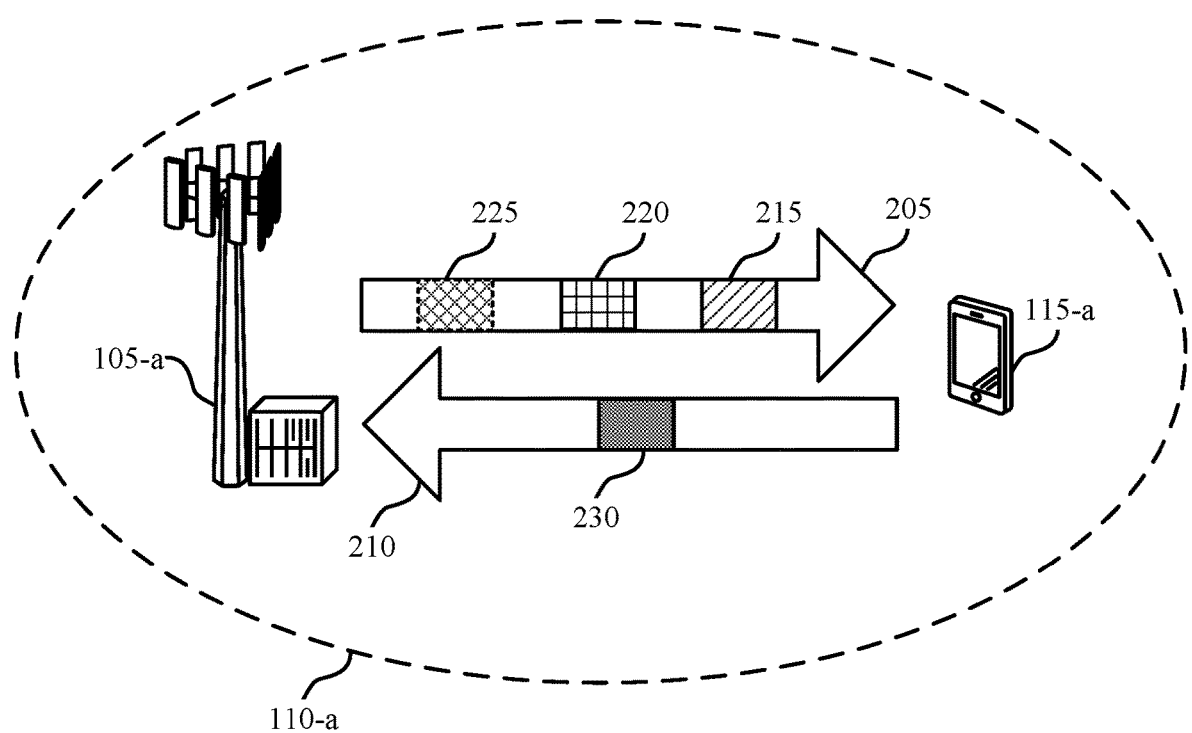
FIG. 2 illustrates an example of a wireless communications system that supports grant free uplink transmission techniques in accordance with aspects of the present disclosure.
Figure 2:
Figure 2:
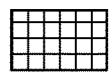
Figure 2:
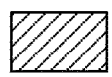
Figure 2:

FIG. 2 illustrates an example of a wireless communications system 200 that supports grant free uplink transmission techniques in accordance with aspects of the present disclosure. In some examples, wireless communications system 200 may implement aspects of wireless communications system 100. Wireless communications system 200 includes a base station 105-a supporting communication with a UE 115-a within geographic coverage area 110-a. Base station 105-a and UE 115-a may be examples of the corresponding devices described with reference to FIG. 1.

In some examples, base station 105-a and UE 115-a may exchange messages (e.g., data or control) via downlink communication link 205 and uplink communication link 210. Base station 105-a may transmit a downlink message via downlink communication link 205, which may contain information configuring UE 115-a to perform grant free uplink transmissions. In some examples, the downlink message may include a grant free indication 215, a slot configuration 220, and a dynamic slot configuration 225.

Grant free indication 215 may indicate which type of grant free uplink transmission technique UE 115-a may use for grant free uplink transmission (e.g., Type-1 or Type-2). Further, grant free indication 215 may configure a set of time-frequency resources available for grant free uplink transmission, which may be provided or conveyed via a transmission pattern. The transmission pattern may be used to determine transmission opportunity resources based on a resource offset and a periodicity for the UE 115-a. For example, if grant free indication 215 indicates a transmission pattern having a resource offset of five and periodicity of six, UE 115-a may utilize the fifth resource set (e.g., RB, resource element (RE), group of RBs or REs) in every sixth slot designated for uplink when determining transmission opportunities for uplink data.

In some examples, grant free indication 215 may configure UE 115-a to use a first grant free uplink transmission technique (e.g., Type-1), where the UE 115-a applies the periodicity and offset values only to the symbols designated for uplink transmission by slot configuration 220. In other examples, grant free indication 215 may configure UE 115-a to use a second grant free uplink transmission technique (e.g., Type-2), where the UE 115-a applies the periodicity and offset values to the symbols designated for uplink transmission by slot configuration 220 as well as flexible symbols that are specified as uplink symbols according to the dynamic slot configuration 225. In some examples, grant free indication 215 may be transmitted via RRC signaling.

Slot configuration 220 may be a semi-static slot configuration, which may designate symbols within available slots for uplink, downlink, or flexible (e.g., uplink or downlink). In some cases, the symbols designated for flexible transmissions may be assigned for either uplink transmissions or downlink transmissions by dynamic slot configuration 225. Slot configuration 220 may be transmitted via RRC signaling.

Dynamic slot configuration 225 may assign the symbols designated for flexible transmissions by slot configuration 220 to uplink transmissions or downlink transmissions. Dynamic slot configuration 225 may be transmitted via DCI.

UE 115-a may determine uplink transmission opportunities for a grant free uplink data transmission based on the grant free indication 215, the slot configuration 220, or the dynamic slot configuration 225. UE 115-a may transmit grant free uplink data 230 via uplink communication link 210 based on the determined uplink transmission opportunities. For example, UE 115-a may receive grant free indication 215 from base station 105-a, which may indicate which technique UE 115-a may use for grant free uplink transmissions (e.g., Type-1 or Type-2) as well as a resource offset and periodicity (e.g., via a transmission pattern) for choosing an uplink transmission opportunity for grant free uplink transmissions. If grant free indication 215 configures UE 115-a for Type-1, UE 115-a may determine the uplink transmission opportunities using the resource offset and periodicity applied to only the symbols designated for uplink by the slot configuration 220.

If grant free indication 215 configures UE 115-a for Type-2, UE 115-a may determine the uplink transmission opportunities using the resource offset and periodicity applied to the symbols designated for uplink by the slot configuration 220 and the flexible symbols specified as uplink symbols by dynamic slot configuration 225.

Generally, UE 115-a may transmit grant free uplink data 230 based on the information received from grant free indication 215, slot configuration 220, and/or dynamic slot configuration 225. In such cases, base station 105-a and UE 115-a may utilize a consistent method of identifying uplink transmission occasions, which may result in the resource allocation configuration for grant free uplink being enforced without error. Further, base station 105-a may be able to correctly identify the resources used for grant free uplink transmission, thereby resulting in simple, reliable detection of grant free uplink transmissions.

Figure 3A:
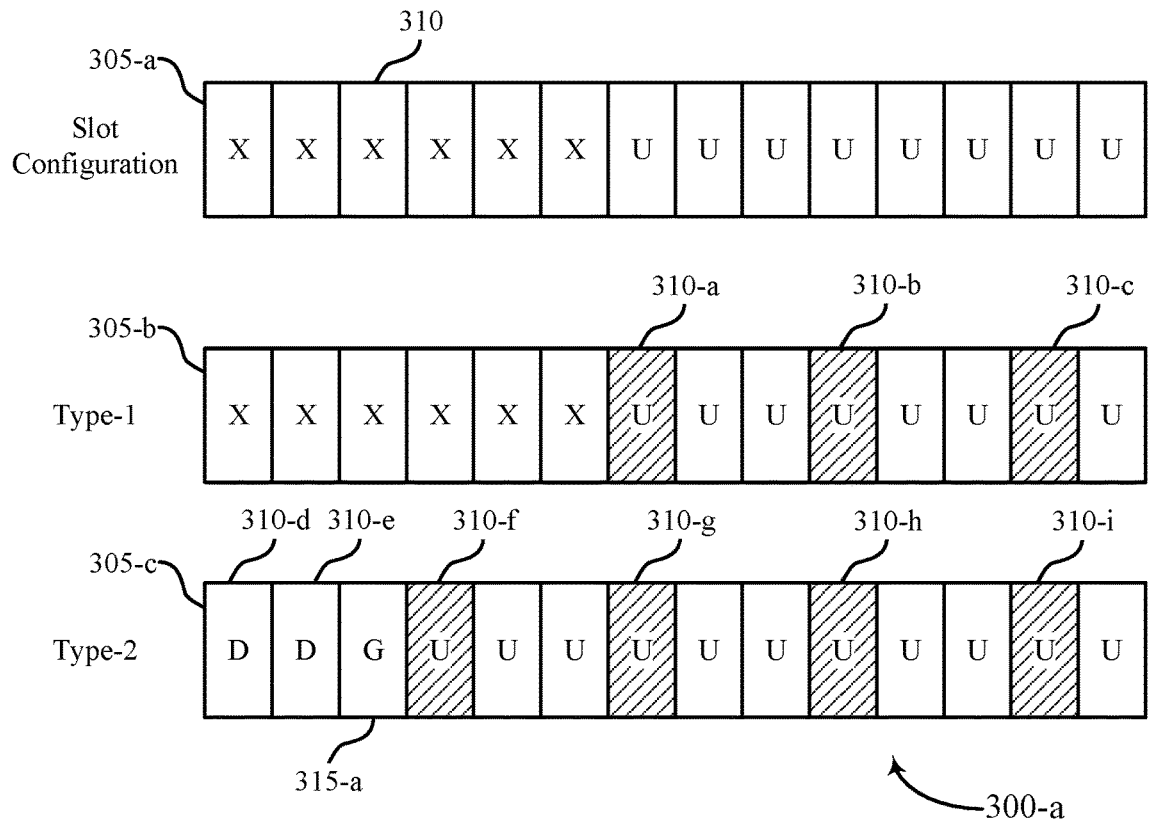
FIGS. 3A and 3B illustrate example slot configurations that support grant free uplink transmission techniques in accordance with aspects of the present disclosure.
Figure 3B:
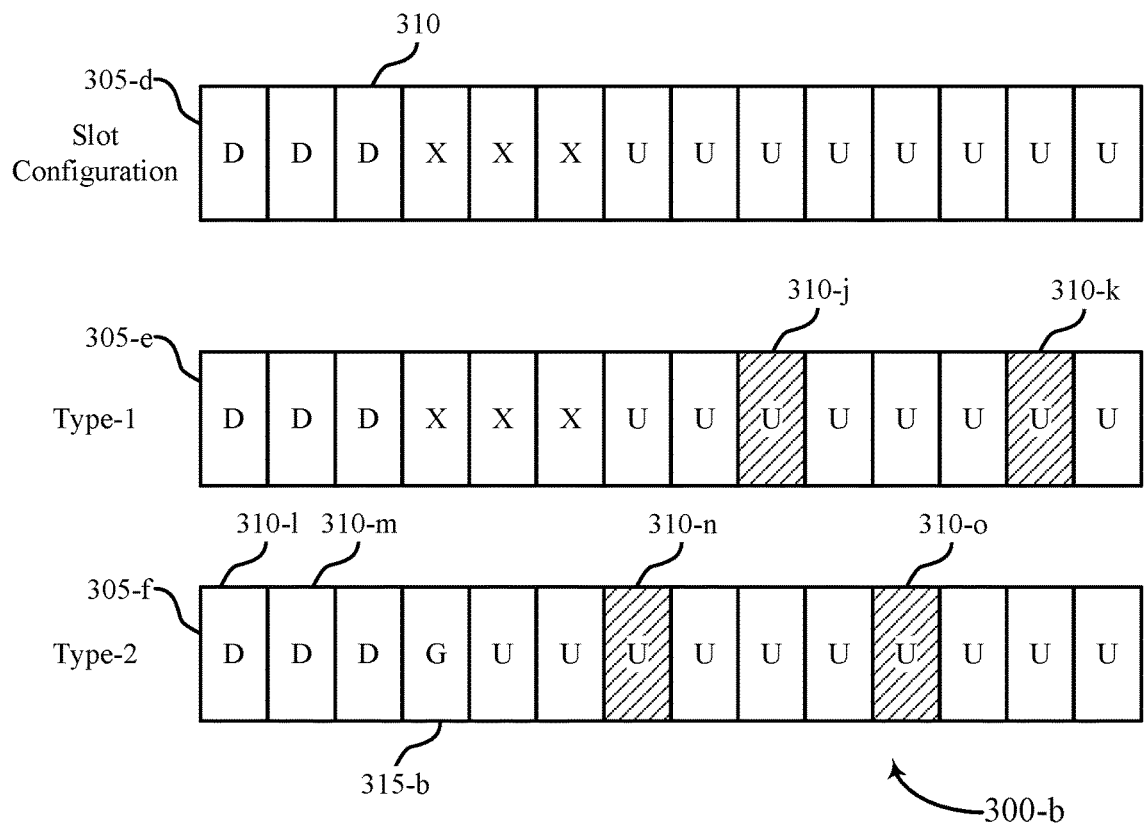

FIGS. 3A and 3B illustrate example slot configurations 300 that support grant free uplink transmission techniques in accordance with aspects of the present disclosure. In some examples, slot configurations 300 may be implemented by aspects of wireless communications systems 100 and 200.

In FIG. 3A, a base station 105 may transmit a grant free indication to a UE 115, which may configure the UE 115 to utilize a grant free uplink transmission technique (e.g., Type-1 or Type-2). Further, the grant free indication may configure a resource offset and periodicity for the UE 115, which may indicate which resources to use for grant free uplink transmissions. In some cases, the base station 105 may transmit a slot configuration (e.g., a semi-static slot configuration) to a UE 115, which may designate the symbols 310 of a slot 305 to be used for uplink transmissions (U), downlink transmissions (D), flexible transmissions (X), or as a guard symbol (G). For example, a semi-static slot configuration may define slot 305-a such that the first six symbols 310 of slot 305-a are designated for flexible transmissions and the last eight symbols of slot 305-*a* are designated for uplink transmissions.

In some examples, the base station 105 may transmit a grant free indication that configures the UE 115 to utilize a first grant free transmission type (e.g., Type-1), which may apply the resource offset and periodicity configured in the grant free indication to only the symbols 310 of slot 305-*b* designated for uplink transmission by a semi-static slot configuration. In such cases, the symbol designation of slot 305-*b* may the same as the symbol designation of slot 305-*a* such that the flexible symbols 310 are not designated as either uplink symbols, downlink symbols, or guard symbols. When the resource offset is configured as two (e.g., every other RB) and the periodicity is configured as three, for example, the UE 115 may determine the transmission opportunities as every other RB in every third uplink symbol in slot 305-*b*, as indicated by symbols 310-*a*, 310-*b*, and 310-*c*. In any of these symbols 310-*a*, 310-*b*, and 310-*c*, the UE 115 may determine to transmit uplink grant free data.

In other examples, the base station 105 may transmit a grant free indication that configures the UE 115 to utilize a second grant free transmission type (e.g., Type-2), which may apply the resource offset and periodicity configured in the grant free indication to the symbols 310 of a slot 305-*c* designated for uplink transmission by both the semi-static slot configuration and a semi-persistent slot configuration. In some cases, the flexible symbols 310 of slot 305-*c* may be designated for uplink transmissions, downlink transmissions, or as guard symbols based on a dynamic slot configuration or indication (e.g., an SFI). For example, the base station 105 may transmit a dynamic slot configuration such that the first two flexible symbols of slot 305-*c* are designated for downlink transmission, the third flexible symbol of slot 305-*c* is designated as a guard symbol 315-*a*, and the last three flexible symbols of slot 305-*c* are designated for uplink transmissions. When the resource offset is configured as two (e.g., every other RB) and the periodicity is configured as three, for example, the UE 115 may determine the transmission opportunities as every other RB in every third uplink symbol designated for uplink transmissions (including those symbols specified as uplink by the dynamic slot configuration) in slot 305-*c*, as indicated by symbols 310-*f*, 310-*g*, and 310-*h*, and 310-*i*. In any of these symbols 310-*f*, 310-*g*, 310-*h*, and 310-*i* the UE 115 may determine to transmit uplink grant free data.

In some examples, the slot configuration may be transmitted in the first two symbols of a slot 305, as shown by symbols 310-*d* and 310-*e* of slot 305-*c*. In some cases, the slot configuration may designate flexible symbols 310 for either uplink transmissions or downlink transmissions of slots 305 that are subsequent to the dynamic slot configuration.

FIG. 3B illustrates an example of a slot configuration 300-*b*, which may be implemented by aspects of wireless communications systems 100 and 200. In some examples, a base station 105 may transmit a grant free indication to a UE 115, which may configure the UE 115 to utilize a grant free uplink transmission technique (e.g., Type-1 or Type-2). Further, the grant free indication may configure a resource offset and periodicity for the UE 115, which may indicate which resources to use for grant free uplink transmissions. In some cases, the base station 105 may transmit a semi-static slot configuration to a UE 115, which may designate the symbols 310 of a slot 305 to be used for uplink transmissions (U), downlink transmissions (D), flexible transmissions (X), or as a guard symbol (G). For example, a semi-static slot configuration may define slot 305-*d* such that the first three symbols 310 of slot 305-*d* are designated for downlink transmissions, the second three symbols 310 of slot 305-*d* are designated for flexible transmissions, and the last eight symbols of slot 305-*a* are designated for uplink transmissions.

In some examples, the base station 105 may transmit a grant free indication that configures the UE 115 to utilize a first grant free transmission type (e.g., Type-1), which may apply the resource offset and periodicity configured in the grant free indication to only the symbols 310 of slot 305-*e* designated for uplink transmission by a semi-static slot configuration. In such a case, the symbol designation of slot 305-*e* may the same as the symbol designation of slot 305-*d* such that the flexible symbols 310 are not designated as either uplink symbols, downlink symbols, or guard symbols. When the resource offset is configured as three and the periodicity is configured as four, for example, the UE 115 may determine the transmission opportunities as every third RB in every fourth uplink symbol designated for uplink transmissions in slot 305-*e*, as indicated by symbols 310-*j* and 310-*k*. In any of these symbols 310-*j* and 310-*k* the UE 115 may determine to transmit uplink grant free data.

In other examples, the base station 105 may transmit a grant free indication that configures the UE 115 to utilize a second grant free transmission type (e.g., Type-2), which may apply the resource offset and periodicity configured in the grant free indication to the symbols 310 of a slot 305-*f* designated for uplink transmission by both the semi-static slot configuration and a dynamic slot configuration. In some cases, the flexible symbols 310 of slot 305-*f* may be designated for uplink transmissions, downlink transmissions, or as guard symbols based on dynamic slot configuration. For example, the base station 105 may transmit a dynamic configuration such that the first flexible symbol of slot 305-*f* is designated as a guard symbol 315-*b* and the last two flexible symbols of slot 305-*f* are designated for uplink transmissions. When the resource offset is configured as three and the periodicity is configured as four, for example, the UE 115 may determine the transmission opportunities as every third RB in every fourth uplink symbol designated for uplink transmissions (including those symbols specified as uplink by the dynamic slot configuration) in slot 305-*f*, as indicated by symbols 310-*n* and 310-*o*.

In some examples, the slot configuration may be transmitted in the first two symbols of a slot 305, as shown by symbols 310-*l* and 310-*m* of slot 305-*f*. In some cases, the dynamic slot configuration may designate flexible symbols 310 for either uplink transmissions or downlink transmissions of slots 305 that are subsequent to the dynamic slot configuration.

Figure 4:
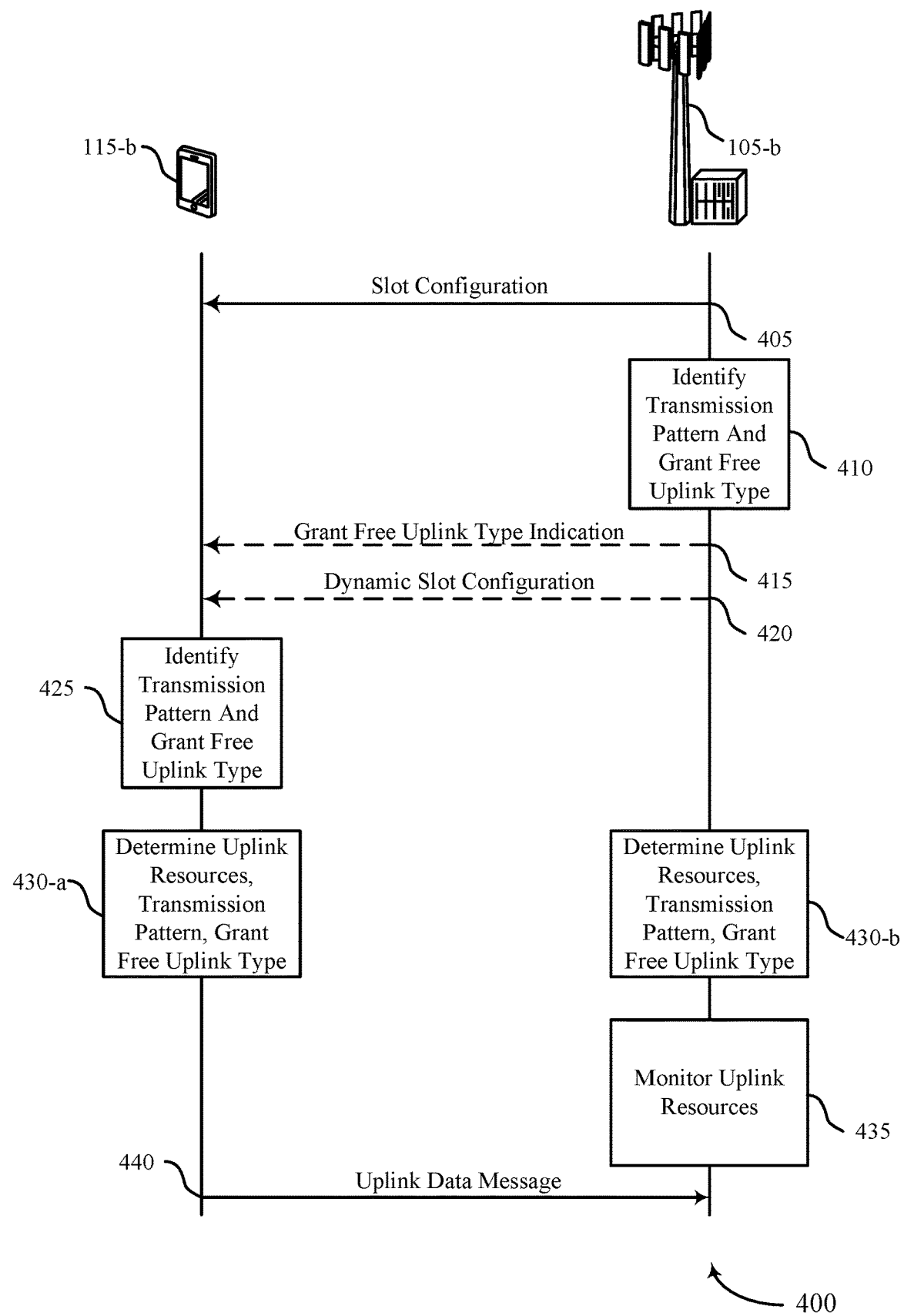
FIG. 4 illustrates an example of a process flow that supports grant free uplink transmission techniques in accordance with aspects of the present disclosure.

FIG. 4 illustrates an example of a process flow 400 that supports grant free uplink transmission techniques in accordance with aspects of the present disclosure. In some examples, process flow 400 may implement aspects of wireless communications systems 100 or 200.

At 405, base station 105-*b* may transmit, to UE 115-*b*, a slot configuration that indicates a link direction pattern for symbols of a first slot, where the link direction pattern specifies each symbol as a downlink symbol, an uplink symbol, or a flexible symbol. In some examples, base station 105-*b* may transmit, and UE 115-*b* may receive, the slot configuration in a slot preceding the first slot.

At 410, base station 105-*b* may identify a transmission pattern of uplink data transmission opportunities and a grant free uplink type for UE 115-*b*, where the grant free uplink type indicates whether to consider flexible symbols as uplink transmission opportunities.

At 415, base station 105-*b* may transmit, to UE 115-*b*, an indication of the grant free uplink type for UE 115-*b*. In some cases, the indication may include a resource offset for the UE. In some cases, the indication may include the periodicity of uplink data transmission opportunities.

At 420, base station 105-*b* may transmit, to UE 115-*b*, a dynamic slot configuration that specifies each symbol specified by the pattern as flexible as an uplink symbol or a downlink symbol. In some cases, base station 105-*b* may transmit the dynamic slot configuration to a UE 115 different than UE 115-*b*.

At 425, UE 115-*b* may identify the transmission pattern of uplink data transmission opportunities and the grant free uplink type. The grant free uplink type may indicate whether to consider flexible symbols as uplink transmission opportunities.

At 430-*a* and 430-*b*, UE 115-*b* and base station 105-*b* may determine a set of uplink resources of the first slot for transmission of uplink data based on the slot configuration, the transmission pattern, and the grant free uplink type. In some cases, the set of uplink resources is determined based on the dynamic slot configuration.

In some examples, the set of uplink resources is determined based on the resource offset for UE 115-*b*.

In some aspects, the set of uplink resources includes a symbol specified by the link direction pattern as flexible based on the dynamic slot configuration. In some cases, the set of uplink resources excludes symbols specified as flexible by the pattern based on the grant free uplink type.

At 435, base station 105-*b* may monitor the determined set of uplink resources for uplink data from the UE.

At 440, UE 115-*b* may transmit, and base station 105-*b* may receive, an uplink data message via the determined set of uplink resources.

Figure 5:
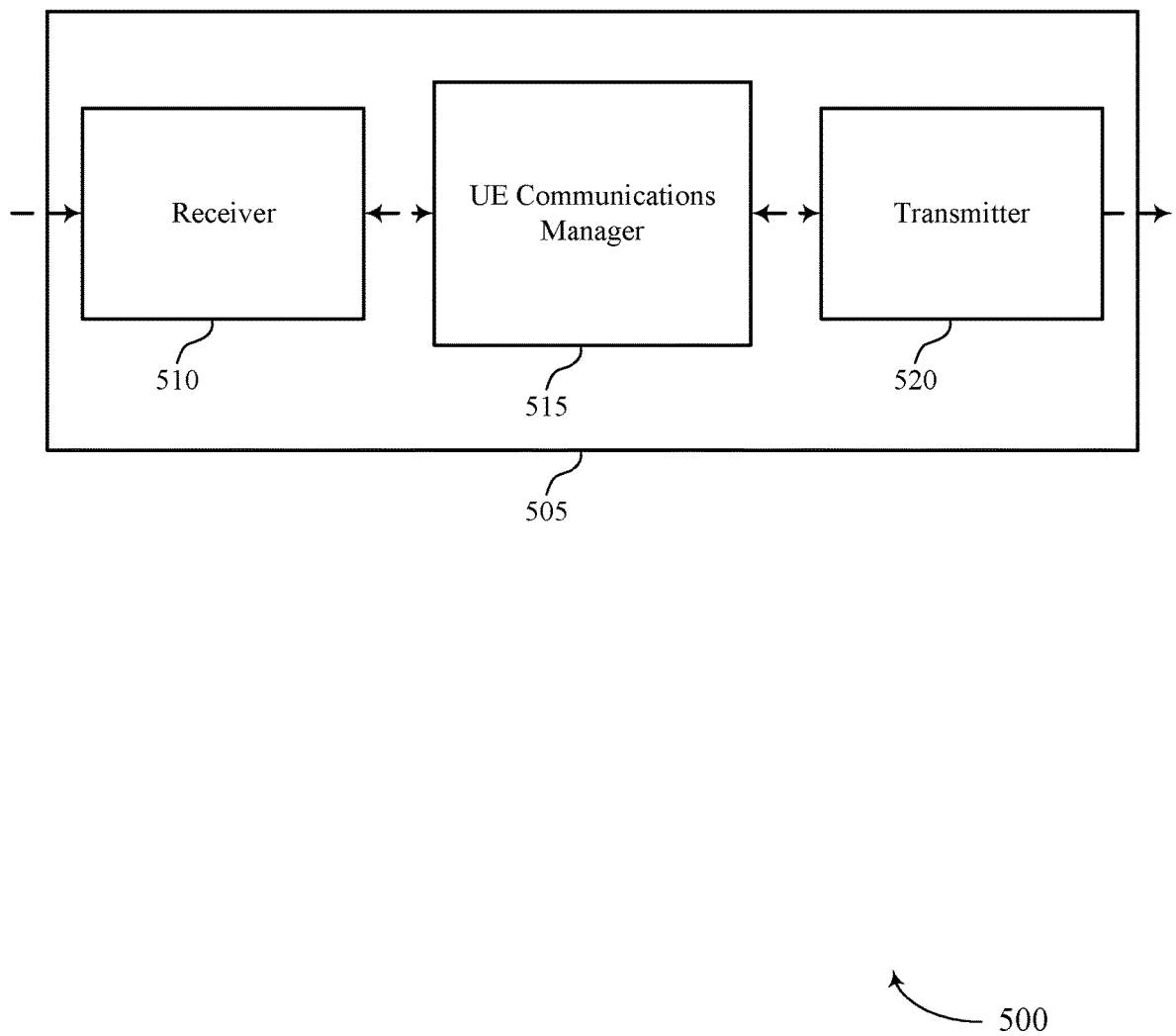
FIGS. 5 through 7 show block diagrams of a device that supports grant free uplink transmission techniques in accordance with aspects of the present disclosure.

FIG. 5 shows a block diagram 500 of a wireless device 505 that supports grant free uplink transmission techniques in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to grant free uplink transmission techniques, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 515 may receive, from a base station, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for a UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and transmit an uplink data message to the base station using the determined set of the uplink resources.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
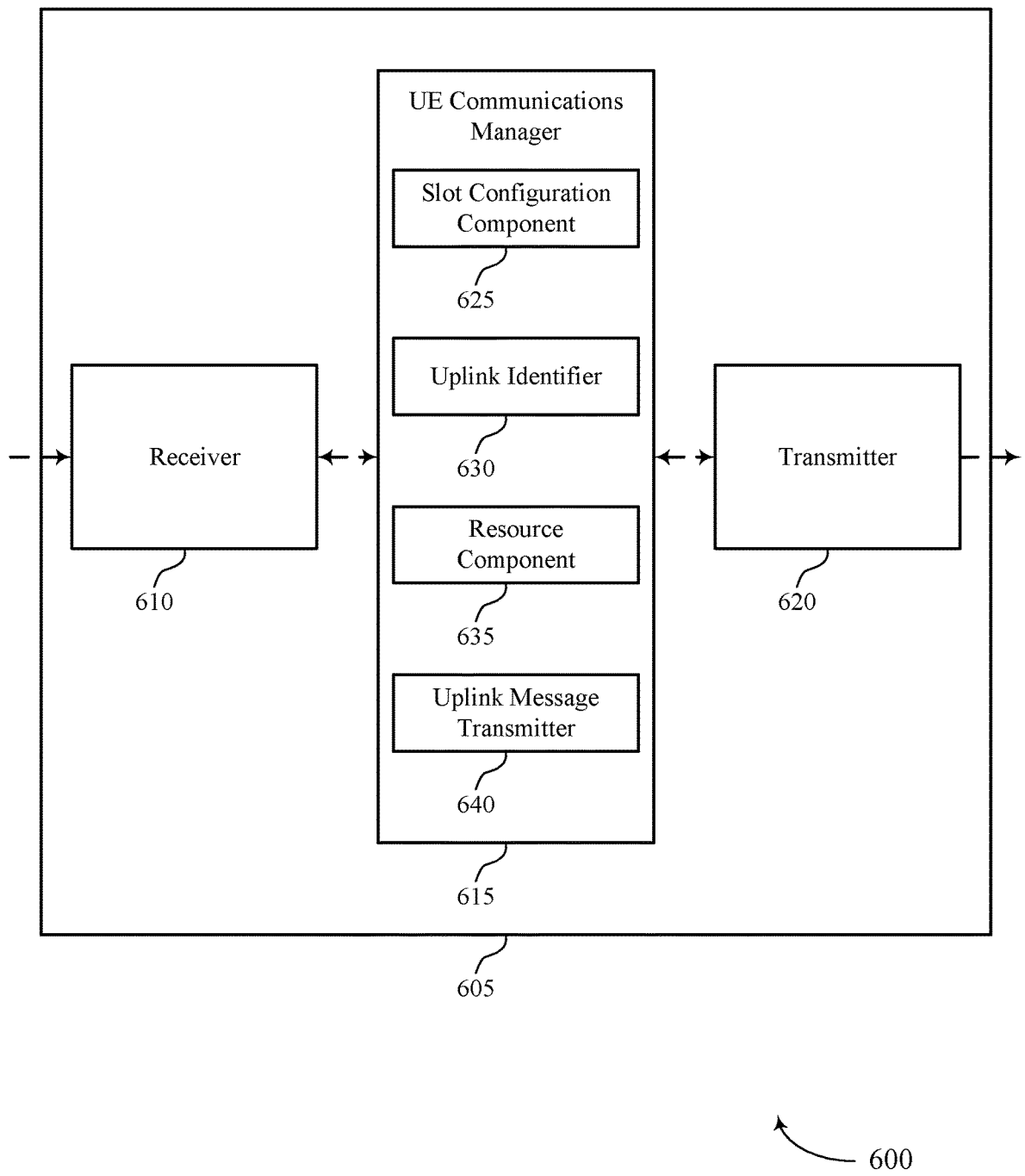

FIG. 6 shows a block diagram 600 of a wireless device 605 that supports grant free uplink transmission techniques in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to grant free uplink transmission techniques, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include slot configuration component 625, uplink identifier 630, resource component 635, and uplink message transmitter 640.

Slot configuration component 625 may receive, from a base station, a slot configuration that indicates a link direction pattern for symbols of a first slot, where the link direction pattern specifies each symbol as a downlink symbol, an uplink symbol, or a flexible symbol, receive a dynamic slot configuration that specifies each flexible symbol specified by the link direction pattern as an uplink symbol or a downlink symbol, where the set of uplink resources is determined based on the dynamic slot configuration, and receive the slot configuration in a slot preceding the first slot.

Uplink identifier 630 may identify a transmission pattern of uplink data transmission opportunities and a grant free uplink type for a UE, where the grant free uplink type indicates whether to consider flexible symbols as uplink transmission opportunities and receive, from the base station, an indication of the grant free uplink type associated with the UE. In some cases, the indication includes the transmission pattern for the UE, the transmission pattern including a resource offset and a periodicity of uplink data transmission opportunities for the UE.

Resource component 635 may determine a set of uplink resources of the first slot for transmission of uplink data based on the slot configuration, the transmission pattern, and the grant free uplink type. In some cases, the set of uplink resources is determined based on the resource offset and the periodicity of uplink data transmission opportunities for the UE. In some cases, the set of uplink resources includes at least one symbol specified by the link direction pattern as flexible based on the dynamic slot configuration. In some cases, the set of uplink resources excludes flexible symbols as specified by the link direction pattern based on the grant free uplink type.

Uplink message transmitter 640 may transmit an uplink data message to the base station using the determined set of the uplink resources.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
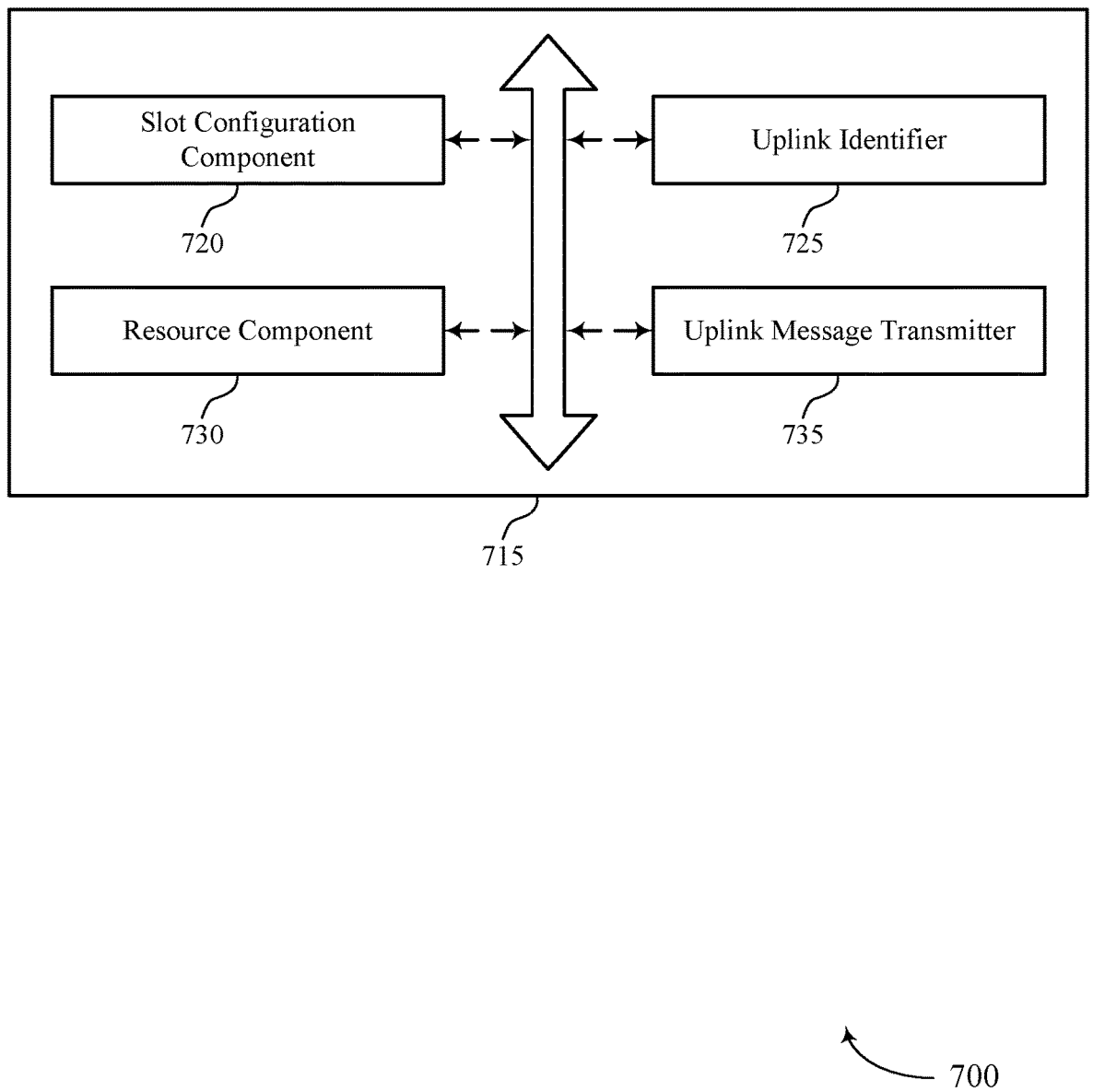

FIG. 7 shows a block diagram 700 of a UE communications manager 715 that supports grant free uplink transmission techniques in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include slot configuration component 720, uplink identifier 725, resource component 730, and uplink message transmitter 735. Each of these modules may communicate, directly or indirectly, with one another (e.g., via one or more buses).

Slot configuration component 720 may receive, from a base station, a slot configuration that indicates a link direction pattern for symbols of a first slot, where the link direction pattern specifies each symbol as a downlink symbol, an uplink symbol, or a flexible symbol, receive a dynamic slot configuration that specifies each flexible symbol specified by the link direction pattern as an uplink symbol or a downlink symbol, where the set of uplink resources is determined based on the dynamic slot configuration, and receive the slot configuration in a slot preceding the first slot.

Uplink identifier 725 may identify a transmission pattern of uplink data transmission opportunities and a grant free uplink type for a UE, where the grant free uplink type indicates whether to consider flexible symbols as uplink transmission opportunities and receive, from the base station, an indication of the grant free uplink type associated with the UE. In some cases, the indication includes the transmission pattern for the UE, the transmission pattern including a resource offset and a periodicity of uplink data transmission opportunities for the UE.

Resource component 730 may determine a set of uplink resources of the first slot for transmission of uplink data based on the slot configuration, the transmission pattern, and the grant free uplink type. In some cases, the set of uplink resources is determined based on the resource offset and the periodicity of uplink data transmission opportunities for the UE. In some cases, the set of uplink resources includes at least one symbol specified by the link direction pattern as flexible based on the dynamic slot configuration. In some cases, the set of uplink resources excludes flexible symbols as specified by the link direction pattern based on the grant free uplink type.

Uplink message transmitter 735 may transmit an uplink data message to the base station using the determined set of the uplink resources.

Figure 8:
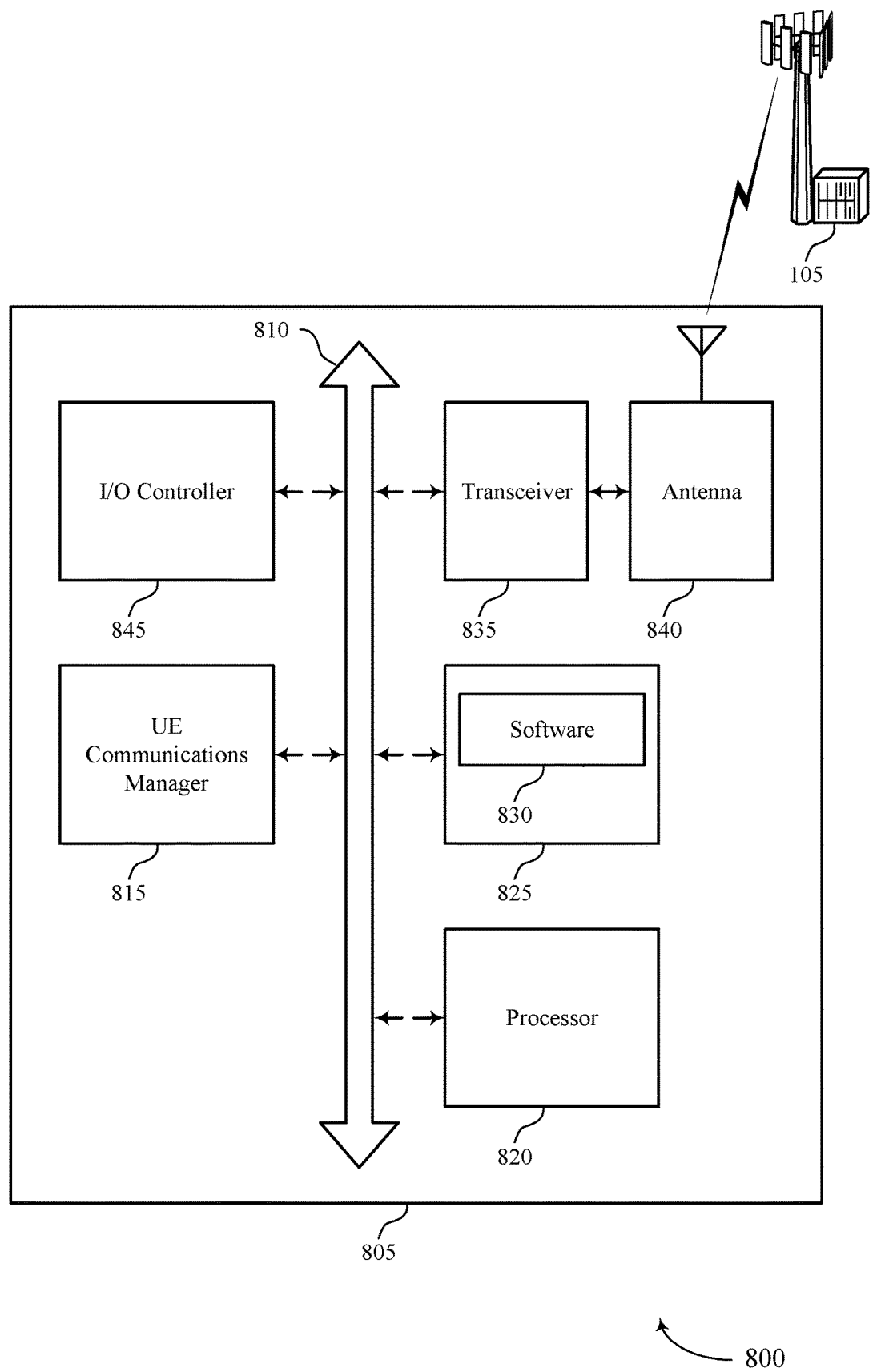
FIG. 8 illustrates a block diagram of a system including a device that supports grant free uplink transmission techniques in accordance with aspects of the present disclosure.

FIG. 8 shows a diagram of a system 800 including a device 805 that supports grant free uplink transmission techniques in accordance with aspects of the present disclosure. Device 805 may be an example of or include the components of wireless device 505, wireless device 605, or a UE 115 as described herein, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting grant free uplink transmission techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic I/O system (BIOS) which may control basic hardware or software operation such as the interaction with peripheral components or devices.

Software 830 may include code to implement aspects of the present disclosure, including code to support grant free uplink transmission techniques. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
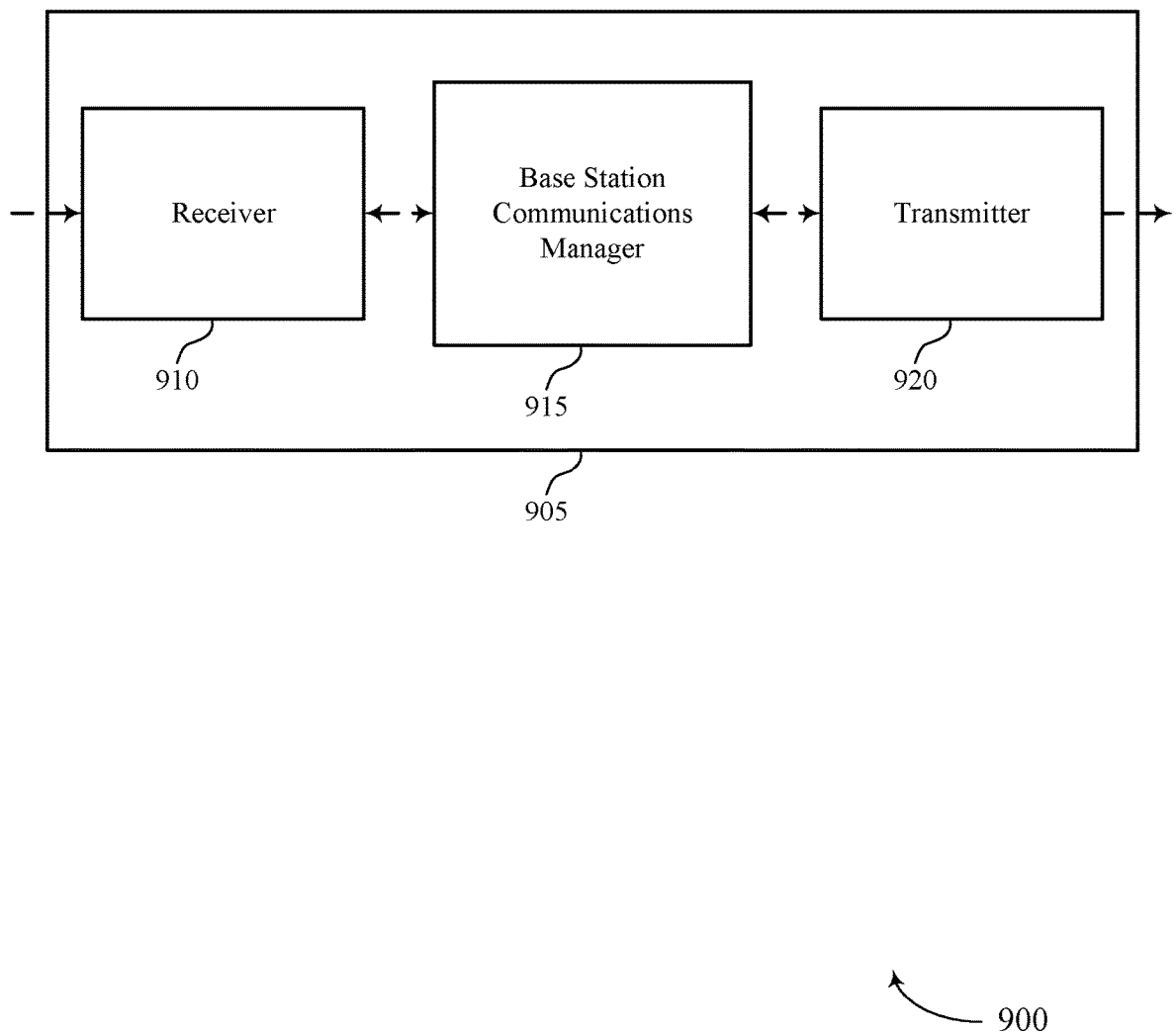
FIGS. 9 through 11 show block diagrams of a device that supports grant free uplink transmission techniques in accordance with aspects of the present disclosure.

FIG. 9 shows a block diagram 900 of a wireless device 905 that supports grant free uplink transmission techniques in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to grant free uplink transmission techniques, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit, to a UE, a slot configuration that indicates a link direction pattern for symbols of a first slot, where the link direction pattern specifies each symbol as a downlink symbol, an uplink symbol, or a flexible symbol, identify a transmission pattern of uplink data transmission opportunities and a grant free uplink type for the UE, where the grant free uplink type indicates whether to consider flexible symbols as uplink transmission opportunities, determine a set of uplink resources of the first slot for transmission of uplink data based on the slot configuration, the transmission pattern, and the grant free uplink type, and monitor the determined set of uplink resources for uplink data from the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
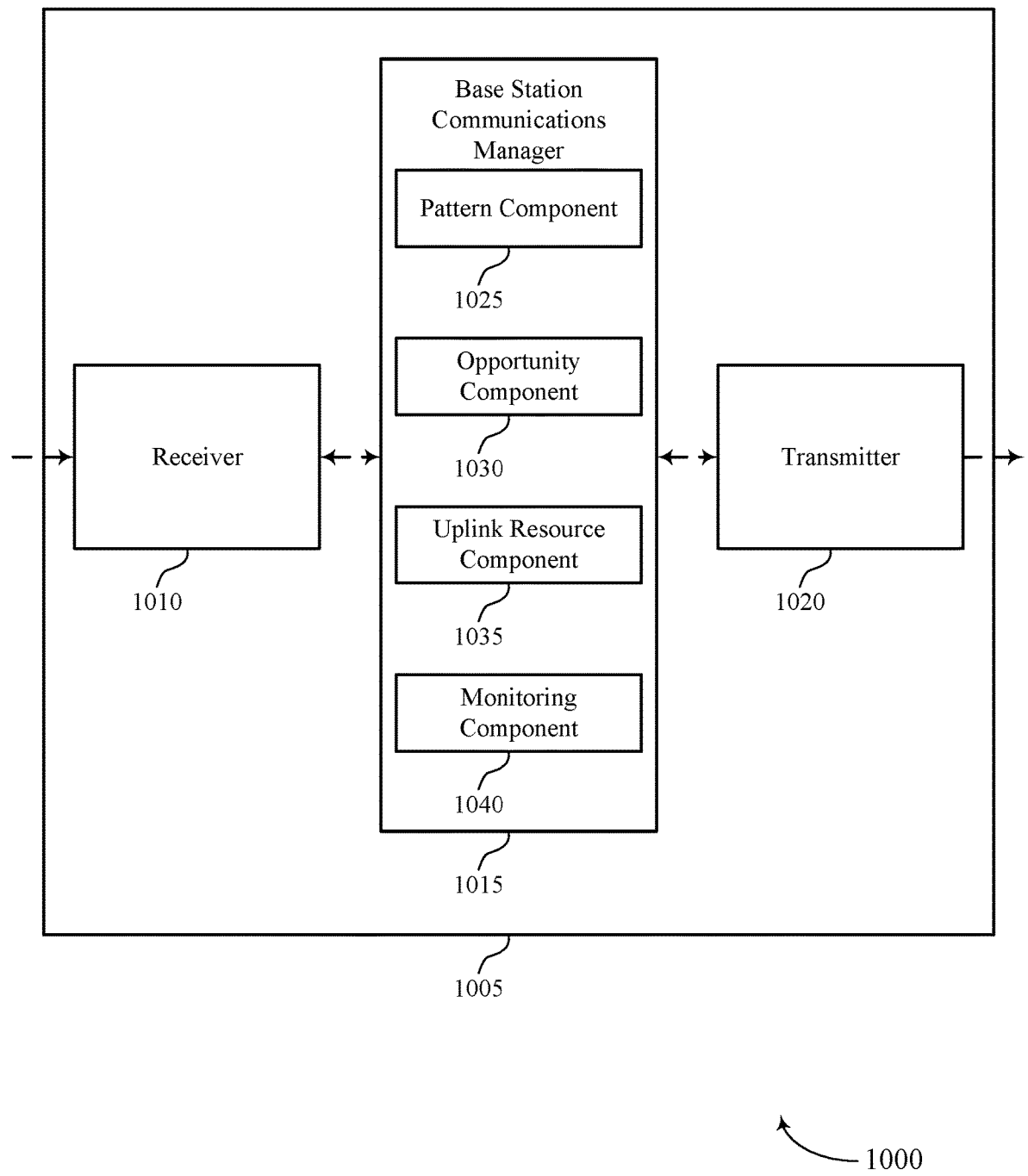

FIG. 10 shows a block diagram 1000 of a wireless device 1005 that supports grant free uplink transmission techniques in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to grant free uplink transmission techniques, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include pattern component 1025, opportunity component 1030, uplink resource component 1035, and monitoring component 1040.

Pattern component 1025 may transmit, to a UE, a slot configuration that indicates a link direction pattern for symbols of a first slot, where the link direction pattern specifies each symbol as a downlink symbol, an uplink symbol, or a flexible symbol, transmit a dynamic slot configuration that specifies each flexible symbol specified by the pattern as an uplink symbol or a downlink symbol, where the set of uplink resources is determined based on the dynamic slot configuration, and transmit the slot configuration in a slot preceding the first slot. In some cases, the dynamic slot configuration is transmitted to the UE or a different UE.

Opportunity component 1030 may identify a transmission pattern of uplink data transmission opportunities and a grant free uplink type for the UE, where the grant free uplink type indicates whether to consider flexible symbols as uplink transmission opportunities and transmit, to the UE, an indication of the grant free uplink type for the UE. In some cases, the indication includes the transmission pattern for the UE, the transmission pattern including a resource offset and a periodicity of uplink data transmission opportunities for the UE.

Uplink resource component 1035 may determine a set of uplink resources of the first slot for transmission of uplink data based on the slot configuration, the transmission pattern, and the grant free uplink type. In some cases, the set of uplink resources are monitored based on the resource offset and the periodicity of uplink data transmission opportunities for the UE. In some cases, the set of uplink resources includes at least one symbol specified by the link direction pattern as flexible based on the dynamic slot configuration. In some cases, the set of uplink resources excludes flexible symbols as specified by the link direction pattern based on the grant free uplink type.

Monitoring component 1040 may monitor the determined set of uplink resources for uplink data from the UE. In some cases, monitoring the determined set of uplink resources includes receiving, from the UE, an uplink data message via the determined set of uplink resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
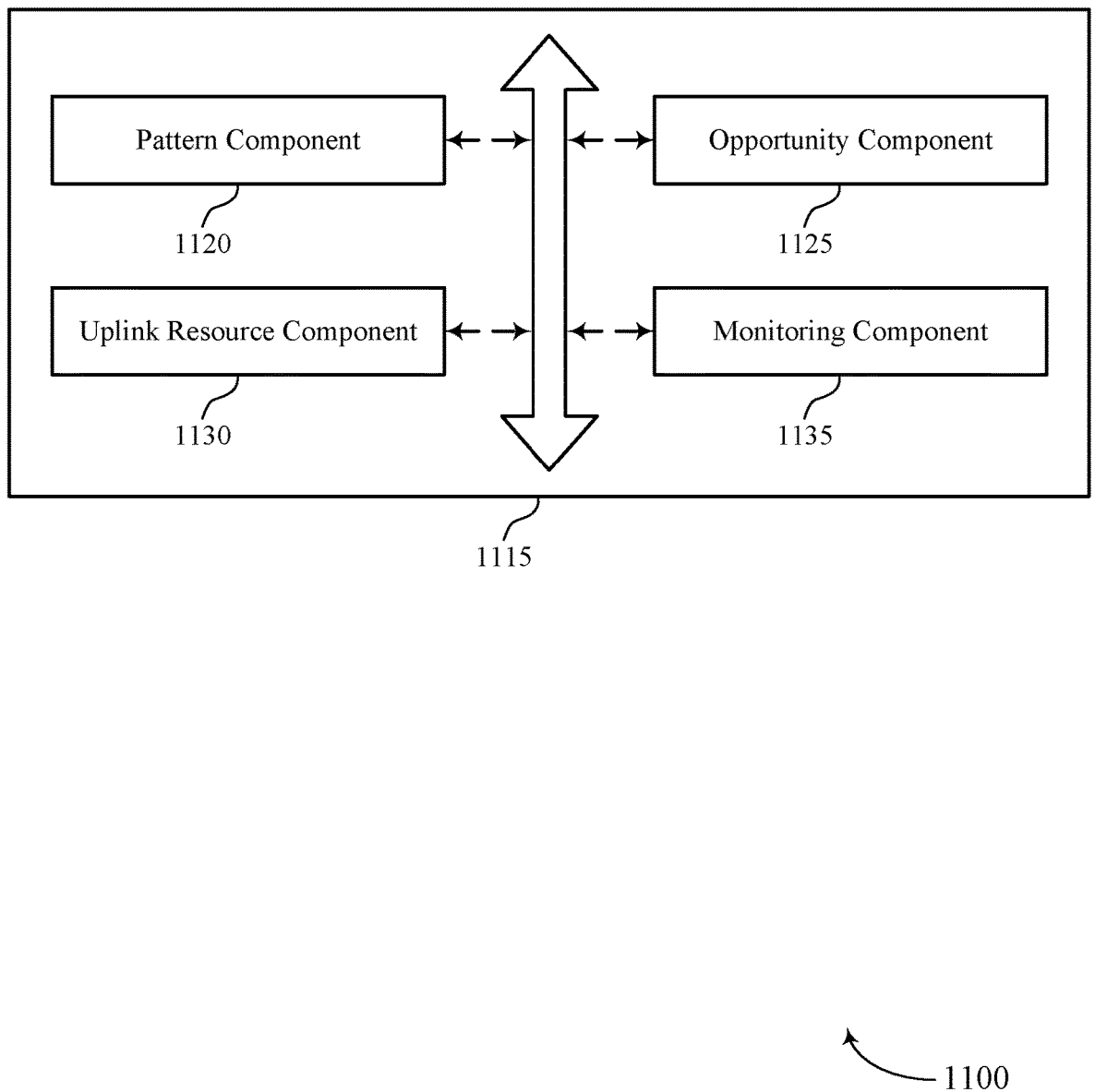

FIG. 11 shows a block diagram 1100 of a base station communications manager 1115 that supports grant free uplink transmission techniques in accordance with aspects of the present disclosure. The base station communications manager 1115 may be an example of aspects of a base station communications manager 1215 described with reference to FIGS. 9, 10, and 12. The base station communications manager 1115 may include pattern component 1120, opportunity component 1125, uplink resource component 1130, and monitoring component 1135. Each of these modules may communicate, directly or indirectly, with one another (e.g., via one or more buses).

Pattern component 1120 may transmit, to a UE, a slot configuration that indicates a link direction pattern for symbols of a first slot, where the link direction pattern specifies each symbol as a downlink symbol, an uplink symbol, or a flexible symbol, transmit a dynamic slot configuration that specifies each flexible symbol specified by the pattern as an uplink symbol or a downlink symbol, where the set of uplink resources is determined based on the dynamic slot configuration, and transmit the slot configuration in a slot preceding the first slot. In some cases, the dynamic slot configuration is transmitted to the UE or a different UE.

Opportunity component 1125 may identify a transmission pattern of uplink data transmission opportunities and a grant free uplink type for the UE, where the grant free uplink type indicates whether to consider flexible symbols as uplink transmission opportunities and transmit, to the UE, an indication of the grant free uplink type for the UE. In some cases, the indication includes the transmission pattern for the UE, the transmission pattern including a resource offset and a periodicity of uplink data transmission opportunities for the UE.

Uplink resource component 1130 may determine a set of uplink resources of the first slot for transmission of uplink data based on the slot configuration, the transmission pattern, and the grant free uplink type. In some cases, the set of uplink resources are monitored based on the resource offset and the periodicity of uplink data transmission opportunities for the UE. In some cases, the set of uplink resources includes at least one symbol specified by the link direction pattern as flexible based on the dynamic slot configuration. In some cases, the set of uplink resources excludes flexible symbols as specified by the link direction pattern based on the grant free uplink type.

Monitoring component 1135 may monitor the determined set of uplink resources for uplink data from the UE. In some cases, monitoring the determined set of uplink resources includes receiving, from the UE, an uplink data message via the determined set of uplink resources.

Figure 12:
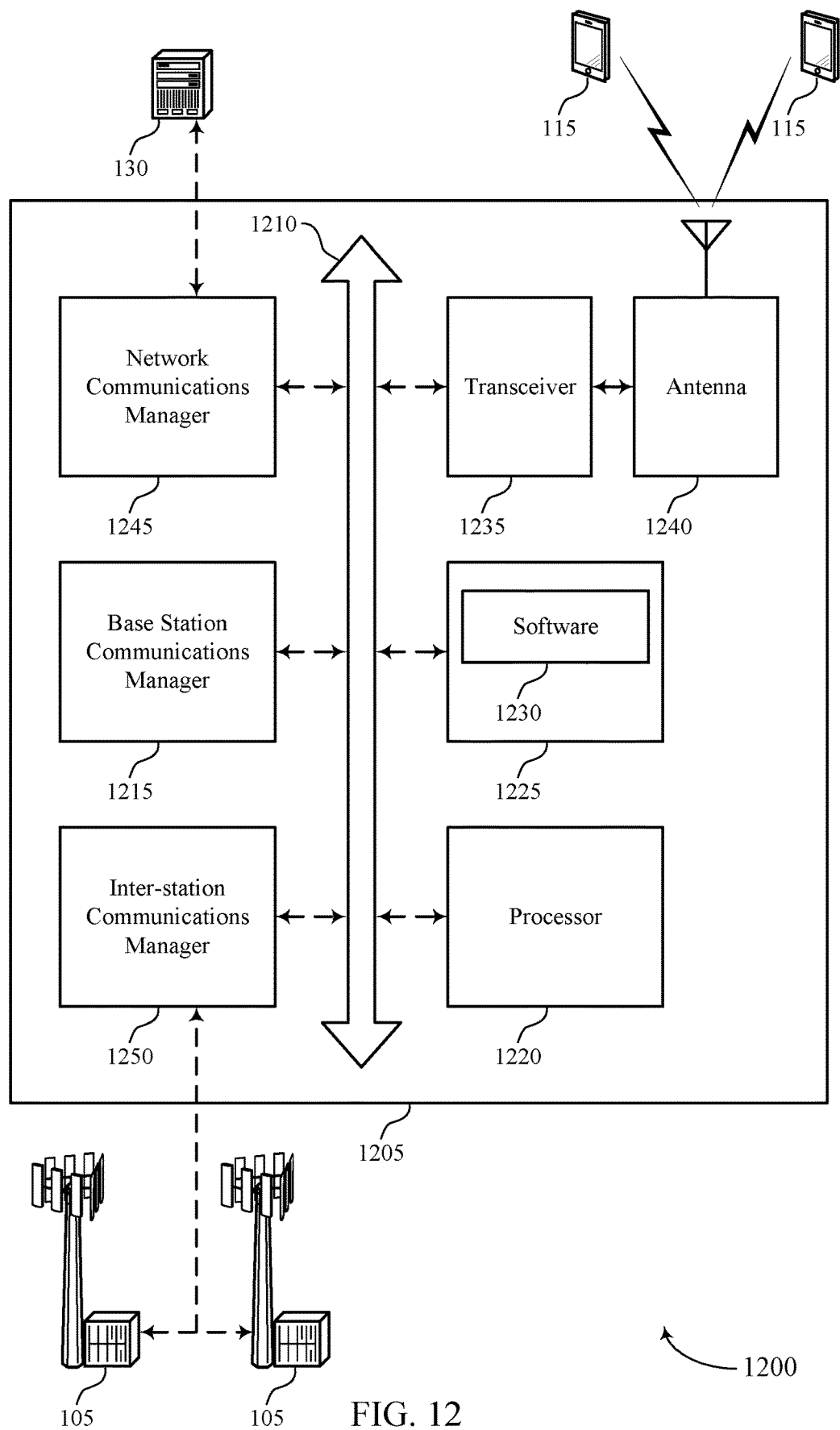
FIG. 12 illustrates a block diagram of a system including a device that supports grant free uplink transmission techniques in accordance with aspects of the present disclosure.

FIG. 12 shows a diagram of a system 1200 including a device 1205 that supports grant free uplink transmission techniques in accordance with aspects of the present disclosure. Device 1205 may be an example of or include the components of base station 105 as described herein, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting grant free uplink transmission techniques).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support grant free uplink transmission techniques. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
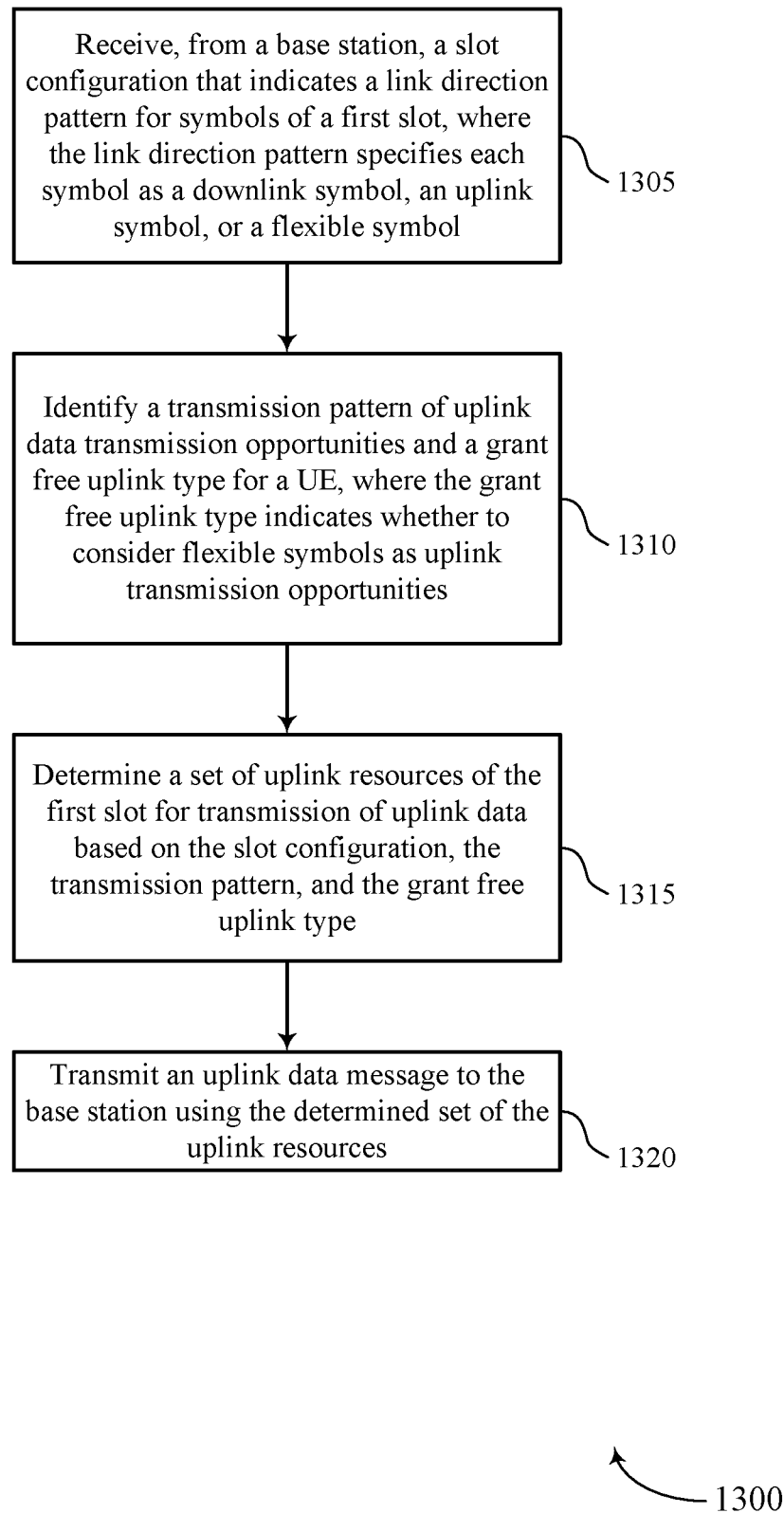
FIGS. 13 through 14 illustrate methods for grant free uplink transmission techniques in accordance with aspects of the present disclosure.

FIG. 13 shows a flowchart illustrating a method 1300 for grant free uplink transmission techniques in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station, a slot configuration that indicates a link direction pattern for symbols of a first slot, where the link direction pattern specifies each symbol as a downlink symbol, an uplink symbol, or a flexible symbol. The operations of 1305 may be performed according to the methods described herein. In certain examples, aspects of the operations of 1305 may be performed by a slot configuration component as described with reference to FIGS. 5 through 8.

At 1310 the UE 115 may identify a transmission pattern of uplink data transmission opportunities and a grant free uplink type for a UE, where the grant free uplink type indicates whether to consider flexible symbols as uplink transmission opportunities. The operations of 1310 may be performed according to the methods described herein. In certain examples, aspects of the operations of 1310 may be performed by an uplink identifier as described with reference to FIGS. 5 through 8.

At 1315 the UE 115 may determine a set of uplink resources of the first slot for transmission of uplink data based on the slot configuration, the transmission pattern, and the grant free uplink type. The operations of 1315 may be performed according to the methods described herein. In certain examples, aspects of the operations of 1315 may be performed by a resource component as described with reference to FIGS. 5 through 8.

At 1320 the UE 115 may transmit an uplink data message to the base station using the determined set of the uplink resources. The operations of 1320 may be performed according to the methods described herein. In certain examples, aspects of the operations of 1320 may be performed by an uplink message transmitter as described with reference to FIGS. 5 through 8.

Figure 14:
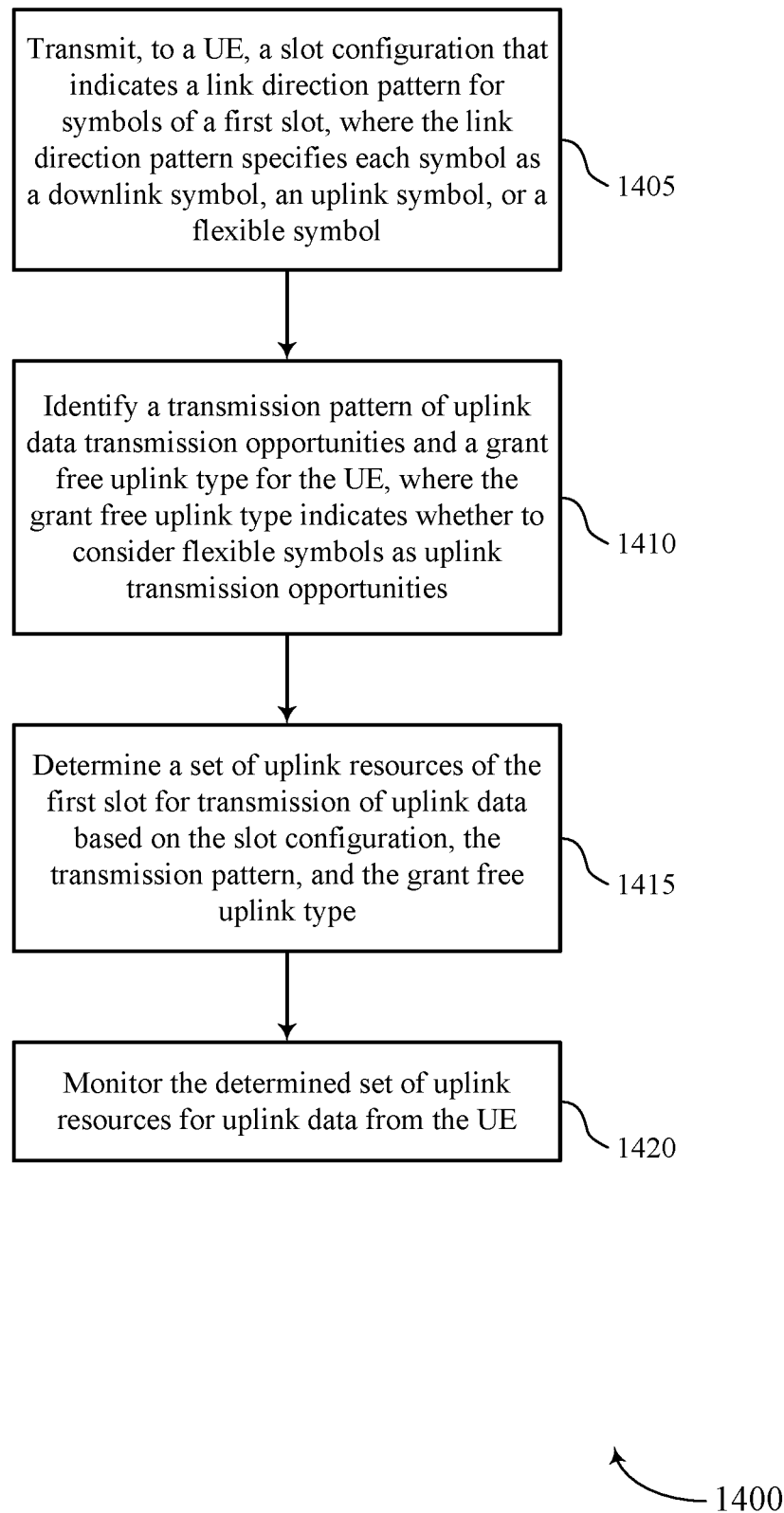

FIG. 14 shows a flowchart illustrating a method 1400 for grant free uplink transmission techniques in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may transmit, to a UE, a slot configuration that indicates a link direction pattern for symbols of a first slot, where the link direction pattern specifies each symbol as a downlink symbol, an uplink symbol, or a flexible symbol. The operations of 1405 may be performed according to the methods described herein. In certain examples, aspects of the operations of 1405 may be performed by a pattern component as described with reference to FIGS. 9 through 12.

At 1410 the base station 105 may identify a transmission pattern of uplink data transmission opportunities and a grant free uplink type for the UE, where the grant free uplink type indicates whether to consider flexible symbols as uplink transmission opportunities. The operations of 1410 may be performed according to the methods described herein. In certain examples, aspects of the operations of 1410 may be performed by an opportunity component as described with reference to FIGS. 9 through 12.

At 1415 the base station 105 may determine a set of uplink resources of the first slot for transmission of uplink data based on the slot configuration, the transmission pattern, and the grant free uplink type. The operations of 1415 may be performed according to the methods described herein. In certain examples, aspects of the operations of 1415 may be performed by an uplink resource component as described with reference to FIGS. 9 through 12.

At 1420 the base station 105 may monitor the determined set of uplink resources for uplink data from the UE. The operations of 1420 may be performed according to the methods described herein. In certain examples, aspects of the operations of 1420 may be performed by a monitoring component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, from a base station, a slot configuration that indicates a link direction pattern for symbols of a first slot, wherein the link direction pattern specifies each symbol as a downlink symbol, an uplink symbol, or a flexible symbol;
identifying a transmission pattern of grant free uplink data transmission opportunities and a grant free uplink type for a user equipment (UE), wherein the grant free uplink type indicates whether to consider flexible symbols as uplink transmission opportunities;
determining a set of uplink resources of the first slot for grant free transmission of uplink data based at least in part on the slot configuration, the transmission pattern, and the grant free uplink type; and
transmitting an uplink data message to the base station using the set of the uplink resources.

2. The method of claim 1, further comprising:
receiving, from the base station, an indication of the grant free uplink type associated with the UE.

3. The method of claim 2, wherein:
the indication comprises the transmission pattern for the UE, the transmission pattern including a resource offset and a periodicity of grant free uplink data transmission opportunities for the UE; and
the set of uplink resources is determined based at least in part on the resource offset and the periodicity of grant free uplink data transmission opportunities for the UE.

4. The method of claim 1, further comprising:
receiving a dynamic slot configuration that specifies each flexible symbol specified by the link direction pattern as an uplink symbol or a downlink symbol, wherein the set of uplink resources is determined based at least in part on the dynamic slot configuration.

5. The method of claim 4, wherein the set of uplink resources comprises at least one symbol specified by the link direction pattern as flexible based at least in part on the dynamic slot configuration.

6. The method of claim 1, wherein the set of uplink resources excludes flexible symbols as specified by the link direction pattern based at least in part on the grant free uplink type.

7. The method of claim 1, further comprising:
receiving the slot configuration in a slot preceding the first slot.

8. A method for wireless communications, comprising:
transmitting, to a user equipment (UE), a slot configuration that indicates a link direction pattern for symbols of a first slot, wherein the link direction pattern specifies each symbol as a downlink symbol, an uplink symbol, or a flexible symbol;
identifying a transmission pattern of grant free uplink data transmission opportunities and a grant free uplink type for the UE, wherein the grant free uplink type indicates whether to consider flexible symbols as uplink transmission opportunities;
determining a set of uplink resources of the first slot for grant free transmission of uplink data based at least in part on the slot configuration, the transmission pattern, and the grant free uplink type; and
monitoring the set of uplink resources for uplink data from the UE.

9. The method of claim 8, further comprising:
transmitting, to the UE, an indication of the grant free uplink type for the UE.

10. The method of claim 9, wherein:
the indication comprises the transmission pattern for the UE, the transmission pattern including a resource offset and a periodicity of grant free uplink data transmission opportunities for the UE; and
the set of uplink resources are monitored based at least in part on the resource offset and the periodicity of grant free uplink data transmission opportunities for the UE.

11. The method of claim 8, further comprising:
transmitting a dynamic slot configuration that specifies each flexible symbol specified by the pattern as an uplink symbol or a downlink symbol, wherein the set of uplink resources is determined based at least in part on the dynamic slot configuration.

12. The method of claim 11, wherein the dynamic slot configuration is transmitted to the UE or a different UE.

13. The method of claim 11, wherein the set of uplink resources comprises at least one symbol specified by the link direction pattern as flexible based at least in part on the dynamic slot configuration.

14. The method of claim 8, wherein monitoring the determined set of uplink resources comprises:
receiving, from the UE, an uplink data message via the set of uplink resources.

15. The method of claim 8, wherein the set of uplink resources excludes flexible symbols as specified by the link direction pattern based at least in part on the grant free uplink type.

16. The method of claim 8, further comprising:
transmitting the slot configuration in a slot preceding the first slot.

17. An apparatus for wireless communications, comprising:
a processor;
memory coupled with the processor; and
instructions stored in the memory and executable by the processor to cause the apparatus to:
receive, from a base station, a slot configuration that indicates a link direction pattern for symbols of a first slot, wherein the link direction pattern specifies each symbol as a downlink symbol, an uplink symbol, or a flexible symbol;

identify a transmission pattern of grant free uplink data transmission opportunities and a grant free uplink type for a user equipment (UE), wherein the grant free uplink type indicates whether to consider flexible symbols as uplink transmission opportunities;

determine a set of uplink resources of the first slot for grant free transmission of uplink data based at least in part on the slot configuration, the transmission pattern, and the grant free uplink type; and transmit an uplink data message to the base station using the set of the uplink resources.

18. The apparatus of claim 17, wherein the instructions are further executable by the processor to cause the apparatus to:

receive, from the base station, an indication of the grant free uplink type associated with the UE, wherein the indication comprises the transmission pattern for the UE, the transmission pattern including a resource offset and a periodicity of grant free uplink data transmission opportunities for the UE, and wherein the set of uplink resources is determined based at least in part on the resource offset and the periodicity of grant free uplink data transmission opportunities for the UE.

19. The apparatus of claim 17, wherein the instructions are further executable by the processor to cause the apparatus to:

receive a dynamic slot configuration that specifies each flexible symbol specified by the link direction pattern as an uplink symbol or a downlink symbol, wherein the set of uplink resources is determined based at least in part on the dynamic slot configuration.

20. The apparatus of claim 19, wherein the set of uplink resources comprises at least one symbol specified by the link direction pattern as flexible based at least in part on the dynamic slot configuration.

21. The apparatus of claim 17, wherein the set of uplink resources excludes flexible symbols as specified by the link direction pattern based at least in part on the grant free uplink type.

22. The apparatus of claim 17, wherein the instructions are further executable by the processor to cause the apparatus to:

receive the slot configuration in a slot preceding the first slot.

23. An apparatus for wireless communications, comprising:

a processor;

memory coupled with the processor; and instructions stored in the memory and executable by the processor to cause the apparatus to:

transmit, to a user equipment (UE), a slot configuration that indicates a link direction pattern for symbols of a first slot, wherein the link direction pattern specifies each symbol as a downlink symbol, an uplink symbol, or a flexible symbol;

identify a transmission pattern of grant free uplink data transmission opportunities and a grant free uplink type for the UE, wherein the grant free uplink type indicates whether to consider flexible symbols as uplink transmission opportunities;

determine a set of uplink resources of the first slot for grant free transmission of uplink data based at least in part on the slot configuration, the transmission pattern, and the grant free uplink type; and monitor the set of uplink resources for uplink data from the UE.

24. The apparatus of claim 23, wherein the instructions are further executable by the processor to cause the apparatus to:

transmit, to the UE, an indication of the grant free uplink type for the UE, wherein the indication comprises the transmission pattern for the UE, the transmission pattern including a resource offset and a periodicity of grant free uplink data transmission opportunities for the UE, and wherein the set of uplink resources are monitored based at least in part on the resource offset and the periodicity of grant free uplink data transmission opportunities for the UE.

25. The apparatus of claim 23, wherein the instructions are further executable by the processor to cause the apparatus to:

transmit a dynamic slot configuration that specifies each flexible symbol specified by the pattern as an uplink symbol or a downlink symbol, wherein the set of uplink resources is determined based at least in part on the dynamic slot configuration.

26. The apparatus of claim 25, wherein the dynamic slot configuration is transmitted to the UE or a different UE.

27. The apparatus of claim 25, wherein the set of uplink resources comprises at least one symbol specified by the link direction pattern as flexible based at least in part on the dynamic slot configuration.

28. The apparatus of claim 23, wherein the instructions to monitor the determined set of uplink resources are executable by the processor to cause the apparatus to:

receive, from the UE, an uplink data message via the set of uplink resources.

29. The apparatus of claim 23, wherein the set of uplink resources excludes flexible symbols as specified by the link direction pattern based at least in part on the grant free uplink type.

30. The apparatus of claim 23, wherein the instructions are further executable by the processor to cause the apparatus to:

transmit the slot configuration in a slot preceding the first slot.

* * * * *